(12) United States Patent
Strathearn et al.

(10) Patent No.: US 11,914,768 B2
(45) Date of Patent: Feb. 27, 2024

(54) RESONANT LIGHT SCANNER HAVING DRIVE-FREQUENCY CONTROL BASED ON AN ELECTRICAL PARAMETER

(71) Applicant: AdHawk Microsystems Inc., Waterloo (CA)

(72) Inventors: Duncan Wesley Strathearn, Waterloo (CA); Kenneth McCoubrey, Kitchener (CA); Nino Zahirovic, Waterloo (CA); Fan Yang, London (CA); Niladri Sarkar, Waterloo (CA)

(73) Assignee: AdHawk Microsystems Inc., Waterloo (CA)

( * ) Notice: Subject to any disclaimer, the term of this patent is extended or adjusted under 35 U.S.C. 154(b) by 0 days.

(21) Appl. No.: 17/874,385

(22) Filed: Jul. 27, 2022

(65) Prior Publication Data
US 2022/0382370 A1   Dec. 1, 2022

Related U.S. Application Data

(63) Continuation-in-part of application No. 17/143,048, filed on Jan. 6, 2021, now Pat. No. 11,435,823, which
(Continued)

(51) Int. Cl.
*G06F 3/01* (2006.01)
*G02B 26/10* (2006.01)
(Continued)

(52) U.S. Cl.
CPC ......... *G06F 3/013* (2013.01); *G02B 26/0833* (2013.01); *G02B 26/105* (2013.01);
(Continued)

(58) Field of Classification Search
CPC ... G06F 3/013; G02B 26/0833; G02B 26/105; G02B 27/0093; G02B 27/0172; G02B 27/0176; G02B 2027/0178
See application file for complete search history.

(56) References Cited

U.S. PATENT DOCUMENTS 5,638,176 A   6/1997   Hobbs et al.
7,388,699 B1   6/2008   Coffee
(Continued)

OTHER PUBLICATIONS

Final Rejection dated Jun. 15, 2020 for U.S. Appl. No. 15/876,148.
(Continued)

*Primary Examiner* — Stephen G Sherman
(74) *Attorney, Agent, or Firm* — Kaplan Breyer Schwarz, LLP

(57) ABSTRACT

Systems and methods for determining the resonant frequencies of at least one axis of a two-axis resonant light scanner based on a measured resistance of at least a portion of one of the axes are disclosed. Precise knowledge of the resonant frequencies of each axis enables quasi-closed-loop operation of a light scanner, wherein the resonant frequencies of its axes can be periodically updated to ensure the proper drive frequencies are used. Furthermore, by determining the relationship between the measured resistance and scanner angle, calibration of the scanner is facilitated and even enabled at the wafer level during fabrication. In some cases, it also enables real-time monitoring of scanner position. Scanners in accordance with the present disclosure are suitable for use in any application that requires one or more reflective elements that can be scanned or steered in at least one dimension.

32 Claims, 22 Drawing Sheets

Related U.S. Application Data is a continuation-in-part of application No. 17/087,302, filed on Nov. 2, 2020, now Pat. No. 11,379,035, which is a continuation of application No. 15/876,148, filed on Jan. 20, 2018, now Pat. No. 10,824,229.

(60) Provisional application No. 62/448,577, filed on Jan. 20, 2017, provisional application No. 63/134,467, filed on Jan. 6, 2021, provisional application No. 62/957,696, filed on Jan. 6, 2020, provisional application No. 63/227,160, filed on Jul. 29, 2021.

(51) Int. Cl.
*G02B 27/00* (2006.01)
*G02B 26/08* (2006.01)
*G02B 27/01* (2006.01)

(52) U.S. Cl.
CPC ..... *G02B 27/0093* (2013.01); *G02B 27/0172* (2013.01); *G02B 27/0176* (2013.01); *G02B 2027/0178* (2013.01)

(56) References Cited

U.S. PATENT DOCUMENTS

| | | | |
|---|---|---|---|
| 10,824,229 | B2 | 11/2020 | Sarkar |
| 11,379,035 | B2 | 7/2022 | Sarkar |
| 11,435,823 | B2 | 9/2022 | Sarkar et al. |
| 2002/0014579 | A1 | 2/2002 | Dunfield |
| 2004/0061831 | A1 | 4/2004 | Aughey et al. |
| 2004/0120023 | A1 | 6/2004 | Bush et al. |
| 2007/0001248 | A1 | 1/2007 | Geisberger et al. |
| 2007/0081241 | A1 | 4/2007 | Hayashi |
| 2008/0266818 | A1 | 10/2008 | Collet et al. |
| 2008/0285103 | A1* | 11/2008 | Mizumoto ......... G02B 26/0858 359/199.1 |
| 2009/0062658 | A1 | 3/2009 | Dunki-Jacobs et al. |
| 2009/0243997 | A1* | 10/2009 | Tierling ................. G06F 3/016 345/156 |
| 2013/0242364 | A1 | 9/2013 | Kilcher et al. |
| 2015/0047078 | A1 | 2/2015 | Sarkar et al. |
| 2015/0235355 | A1 | 8/2015 | Mullins |
| 2016/0029883 | A1 | 2/2016 | Cox |
| 2016/0166146 | A1 | 6/2016 | Sarkar |
| 2016/0240013 | A1 | 8/2016 | Spitzer |
| 2017/0038253 | A1 | 2/2017 | Mallinson |
| 2017/0067609 | A1 | 3/2017 | Ichikawa et al. |
| 2017/0115483 | A1 | 4/2017 | Aleem et al. |
| 2017/0123489 | A1 | 5/2017 | Guenter |
| 2017/0364732 | A1 | 12/2017 | Komogortsev |
| 2018/0189977 | A1 | 7/2018 | Zecchini et al. |
| 2018/0210547 | A1 | 7/2018 | Sarkar |
| 2019/0120940 | A1 | 4/2019 | Pei et al. |
| 2019/0204913 | A1 | 7/2019 | Sarkar et al. |
| 2022/0261074 | A1 | 8/2022 | Zahirovic et al. |

OTHER PUBLICATIONS

Final Rejection received for U.S. Appl. No. 15/876,148, dated Aug. 23, 2019, 11 pages.
Jacob Engelberg et al., "The Advantages of metalenses over diffractive lenses," "Nature Communications", vol. 11, dated 2020 (https://doi.org/10.1038/s41467-020-15972-9), 4 pp.
Non-Final Office Action received for U.S. Appl. No. 15/876, 148, dated Feb. 24, 2020, 15 pages.
Non-Final Rejection dated Apr. 29, 2021 for U.S. Appl. No. 16/232,410.
Non-Final Rejection dated Jan. 7, 2022 for U.S. Appl. No. 17/143,048.
Non-Final Rejection dated Jun. 18, 2020 for U.S. Appl. No. 16/236,993.
Non-Final Rejection dated Oct. 27, 2020 for U.S. Appl. No. 16/234,293.
Non-Final Rejection dated Sep. 3, 2021 for U.S. Appl. No. 17/087,302.
Non-Final Rejection received for U.S. Appl. No. 15/876,148, dated May 3, 2019, 9 pages.
Notice of Allowance and Fees Due (PTOL-85) dated Jul. 16, 2020 for U.S. Appl. No. 15/876,148.
Notice of Allowance and Fees Due (PTOL-85) dated Mar. 23, 2022 for U.S. Appl. No. 17/087,302.
Notice of Allowance and Fees Due (PTOL-85) dated Mar. 5, 2021 for U.S. Appl. No. 16/234,293.
Notice of Allowance and Fees Due (PTOL-85) dated May 18, 2022 for U.S. Appl. No. 17/143,048.
Notice of Allowance and Fees Due (PTOL-85) dated Oct. 7, 2020 for U.S. Appl. No. 16/236,993.
Notice of Allowance dated Oct. 20, 2021 for U.S. Appl. No. 16/232,410.
Zhaoyi Li et al., "Meta-Optics achieves RGB-achromatic focusing for virtual reality," Science Advances, vol. 7, No. 5, Jan. 27, 2021 (www.doi.org/10.1126/sciadv.abe4458), 8 pp.
Notice of Allowance and Fees Due (PTOL-85) dated Oct. 19, 2022 for U.S. Appl. No. 17/673,337.
Notice of Allowance received for U.S. Appl. No. 17/673,337, dated Oct. 27, 2022, 2 pages.
Non-Final Rejection dated May 8, 2023 for U.S. Appl. No. 18/098,899, 13 page(s).
Notice of Allowance and Fees Due (PTOL-85) dated Jul. 10, 2023 for U.S. Appl. No. 18/098,899, 6 page(s).

* cited by examiner

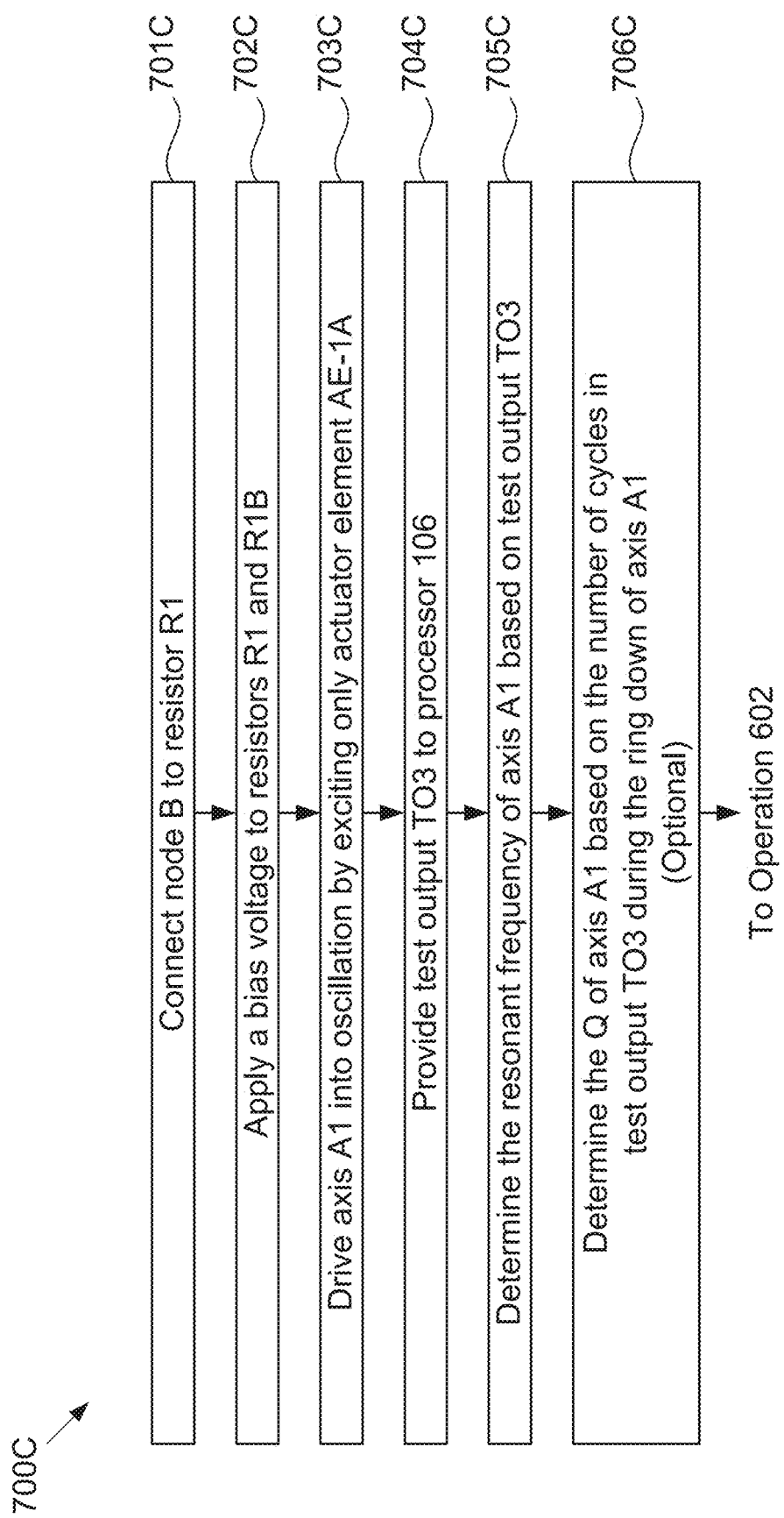

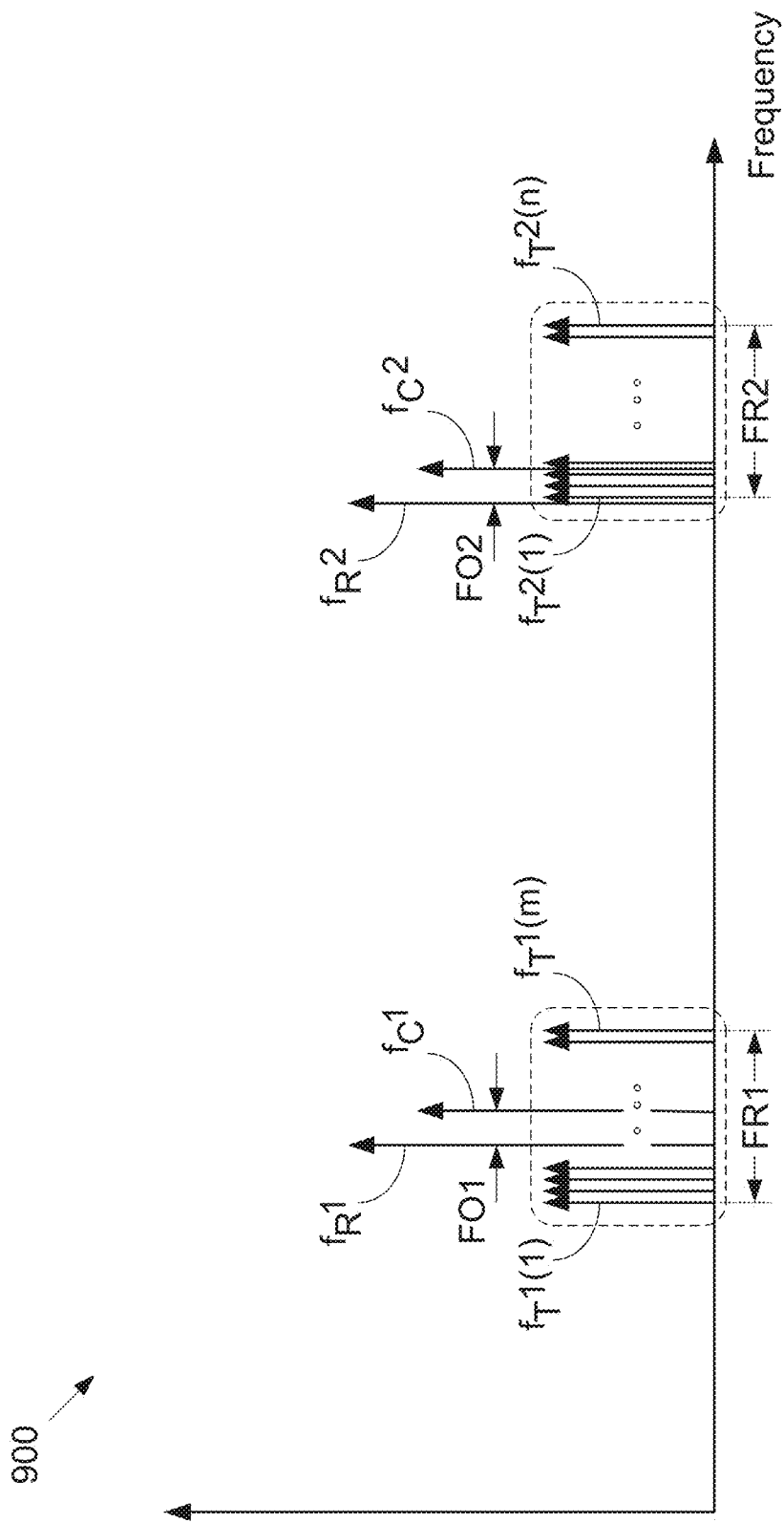

RESONANT LIGHT SCANNER HAVING DRIVE-FREQUENCY CONTROL BASED ON AN ELECTRICAL PARAMETER

CROSS REFERENCE TO RELATED APPLICATIONS

This case is a continuation-in-part of U.S. patent application Ser. No. 17/143,048, filed Jan. 6, 2021, which is a continuation-in-part of U.S. Non-Provisional patent application Ser. No. 17/087,302 (now U.S. Pat. No. 11,379,035), filed Nov. 2, 2020, which is a continuation of U.S. Non-Provisional patent application Ser. No. 15/876,148 (now U.S. Pat. No. 10,824,229), filed Jan. 20, 2018, which claims the benefit of U.S. Provisional Patent Application Ser. No. 62/448,577 filed Jan. 20, 2017, each of which is incorporated by reference as if set forth at length herein.

This case also claims the benefit of U.S. Provisional Patent Application Ser. No. 63/227,160 filed Jul. 29, 2021, which is incorporated by reference as if set forth at length herein.

The present Specification also includes concepts disclosed in U.S. Pat. No. 10,213,105, issued Feb. 26, 2019, U.S. Pat. No. 10,317,672, issued Jun. 11, 2019, and U.S. Pat. No. 10,908,683, issued Feb. 2, 2021, each of which is incorporated by reference as if set forth at length herein. If there are any contradictions or inconsistencies in language between this application and the cases that have been incorporated by reference that might affect the interpretation of the claims in this case, the claims in the instant case should be interpreted to be consistent with the language in the instant Specification.

TECHNICAL FIELD

The present disclosure relates to object-tracking systems and, more particularly, to eye-tracking systems.

BACKGROUND

Scanning micromirrors and/or mirrors (either being generally referred to herein as simply "mirrors") are used to steer optical beams in one or more dimensions in many applications that include LiDAR, object tracking, free-space optical switching, eye tracking and more. Typically, scanning mirrors are driven "open loop," where the positional response of the mirror to a given drive voltage is assumed based on an initial calibration routine in which the position of the mirror is measured for a set of drive voltages, thereby indicating a transfer function for the device.

While open-loop driving of a scanning mirror is the simplest method, there are many factors that can affect a mirror's transfer function and lead to deviations from its anticipated response. Such factors as variation in fabrication, manufacturing positional and angular tolerances, and system drift can all contribute uncertainty in the actual response of a mirror to a given drive signal.

For electrothermally actuated devices, these issues are exacerbated. Subjecting a mirror to large temperature excursions and mechanical stresses is known to accelerate processes like creep, electromigration, chemical reactions, and desorption, all of which contribute to long-term instabilities in the material properties of the MEMS device and, therefore, give rise to changes in its transfer function. Furthermore, package stresses can couple to devices, and variations in package stresses can be caused by gradual changes in substrate temperatures.

Unfortunately, typically, every scanning mirror must be manually tuned to identify its resonant frequency. For a scanning mirror operated at a frequency near its resonance, identification of its resonant frequency is critical.

In eye tracking, device or system drift inevitably leads to a decrease in accuracy over time. A scanning mirror that provides a feedback signal for tracking its instantaneous position would be a welcome advance in the state of the art.

SUMMARY

The present disclosure is directed toward determination of the resonant frequency of the axes of a two-axis, resonant, MEMS-based light scanner. Embodiments in accordance with the present disclosure are particularly well suited for use in object tracking systems that employ a Lissajous light-scan pattern for rapidly interrogating a scan region with high scan density.

An advance over the prior art is realized by estimating the resonance characteristics and behavior of a resonant scanning mirror based on a measured electrical parameter of the device. Since measurement of the electrical parameter can be done rapidly, real-time monitoring of the resonance characteristics during resonant light-scanner operation is possible, thereby enabling quasi-closed-loop scanner control. Easy determination of these resonant frequencies enables screening and/or binning of fabricated light scanners while still at the wafer level, as well as simplified calibration of an object-scanning system in which such a light scanner is incorporated. Furthermore, knowledge of the resonant characteristics of a light scanner during operation enables substantially real-time adjustment of its drive-signal frequencies to optimize performance, as well as drift-aware design strategies during use.

An illustrative embodiment in accordance with the present disclosure is a method for estimating the resonant frequency of each axis of a two-axis, resonant, MEMS-based scanning mirror. The scanning mirror includes a central mirror having orthogonal rotation axes, each driven by a different actuator pair having actuator elements located in either side of the mirror. Each actuator element comprises a material that exhibits piezoresistivity. The resonant frequency of a first axis of the two axes is determined by inducing an oscillation of the mirror about the first axis while monitoring a resistance of the actuator in the second axis. As the first axis oscillates, the motion of the mirror gives rise to convective cooling of the second axis, which changes its resistance due to the thermal coefficient of resistance. When the oscillation is at the resonant frequency of the first axis, the frequency at which the measured resistance changes indicates the resonant frequency of the first axis. The resonant frequency of the second axis is then determined by performing an analogous procedure.

In some embodiments, oscillation of the mirror about a first axis is induced by actuating only a first actuator element on that axis, while the measured parameter is the resistance of the second actuator element on the same axis. As the mirror oscillates about the first axis, the strain induced in the piezoresistive material of the other actuator element gives rise to a cycling of its resistivity at the same frequency as the oscillation. When the first axis is at its resonance, it undergoes its maximum deflection, thereby inducing the maximum strain on the measured actuator element and, thus, the maximum change in resistance.

In some embodiments, a mirror axis includes an additional piezoresistive element whose resistivity is monitored to determine the resonant frequency of that axis.

In some embodiments, feedthrough of the drive signal applied to the driven actuator element to the measured piezoresistive element is mitigated by a compensation network that is operatively coupled to the axis.

In some embodiments, the resonant frequencies of both axes of a two-axis scanning mirror are determined by driving a first actuator element on each axis with an impulse that induces each axis to ring at its natural resonant frequency. Voltages based on the resistances of the second actuator element on each axis are provided to a difference amplifier whose output is applied to a fast-Fourier transform. The output of the fast-Fourier transform includes peaks located at the resonant frequencies of the two axes.

In some embodiments, a scanning mirror includes design features for mitigating mirror drift and/or isolation elements for decoupling the scanning mirror from stresses arising from its packaging. In some embodiments, a scanning mirror includes stress-relief that actively relieves stress as part of a feedback loop with the scanning mirror.

An embodiment in accordance with the present disclosure is a method comprising: inducing a first oscillation on a first axis of a light scanner having scanning element, a first actuator, and a second actuator, the first actuator being configured to rotate the scanning element about the first axis and the second actuator configured to rotate the scanning element about a second axis, wherein the first axis has a first resonant frequency and the second axis has a second resonant frequency; measuring a first resistance of at least a portion of one of the first axis and the second axis in response to the first oscillation; and estimating one of the first resonant frequency and second resonant frequency based on the first resistance.

Another embodiment in accordance with the present disclosure is a method comprising: providing a light scanner having scanning element, a first actuator, and a second actuator, the first actuator being configured to rotate the scanning element about a first axis and the second actuator configured to rotate the scanning element about a second axis, wherein the first axis has a first resonant frequency and the second axis has a second resonant frequency; estimating the first resonant frequency based on a first resistance of at least a portion of one of the first and second actuators; and estimating the second resonant frequency based on a second resistance of at least a portion of the other one of the first and second actuators.

Yet another embodiment in accordance with the present disclosure is a system comprising: a scanner for steering a light signal in a Lissajous pattern over a scan region, wherein the scanner comprises a micromechanical system (MEMS) device that is a two-axis device having a first axis characterized by a first resonant frequency and a second axis characterized by a second resonant frequency; and a processing system configured to: (i) drive the first axis with a first periodic signal that is characterized by a first drive frequency; (ii) drive the second axis with a second periodic signal that is characterized by a second drive frequency; (iii) control the first frequency based on a first resistance of at least a portion of one of the first axis and second axis; and (iv) control the second frequency based on a second resistance of at least a portion of the other one of the first axis and the second axis.

BRIEF DESCRIPTION OF THE DRAWINGS

FIG. 7C depicts sub-operations of a second exemplary sub-method for determining the resonant frequencies of one axis of a two-axis scanning mirror in accordance with the present disclosure.

FIG. 9 depicts plots showing representative sets of test frequencies for driving axes A1 and A2 in accordance with the present disclosure.

DETAILED DESCRIPTION

Figure 1:
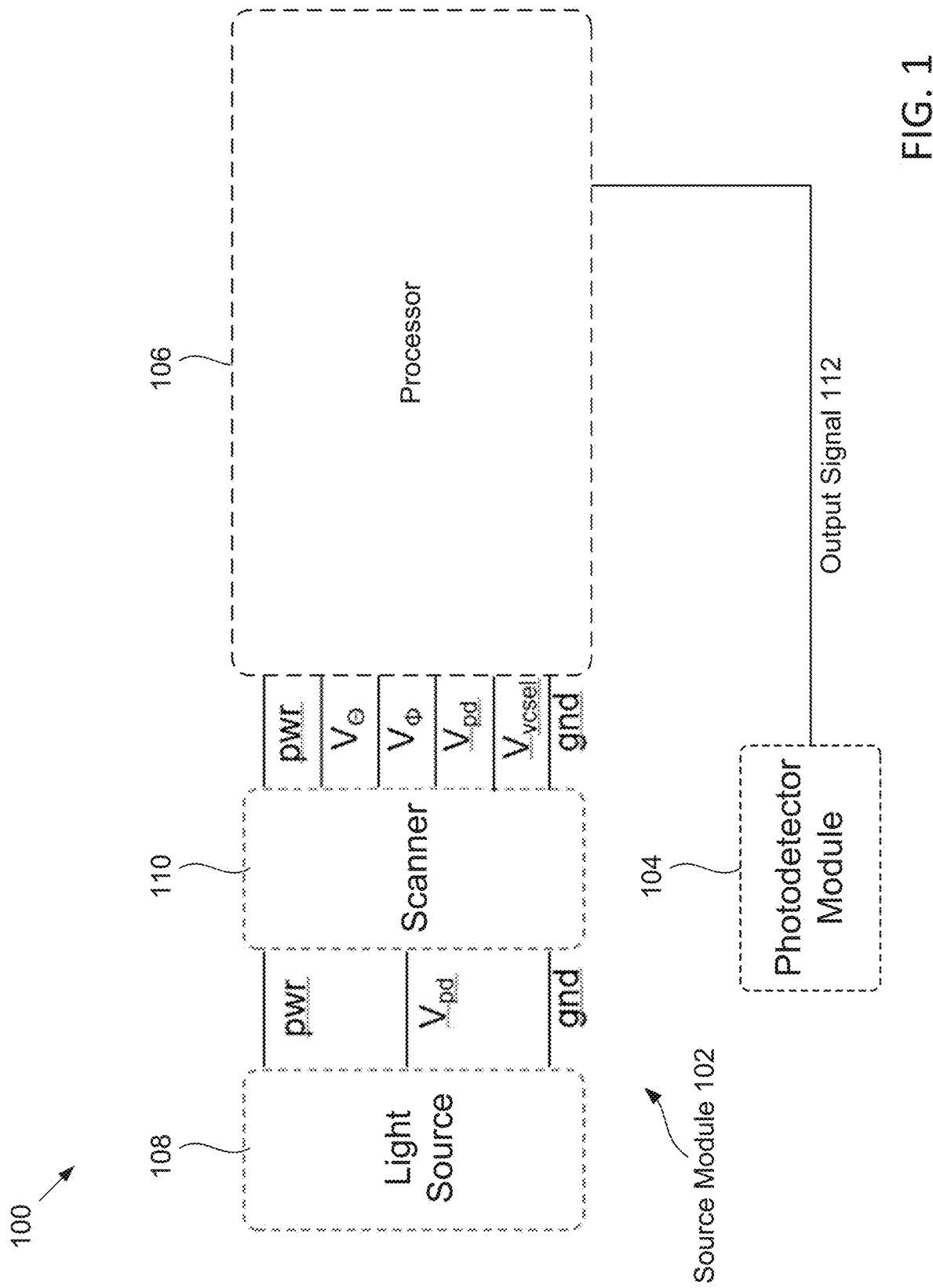
FIG. 1 depicts a schematic block diagram illustrating an eye tracking system according to aspects of the present disclosure.

The following merely illustrates the principles of the disclosure. It will thus be appreciated that those skilled in the art will be able to devise various arrangements which, although not explicitly described or shown herein, embody the principles of the disclosure and are included within its spirit and scope.

Furthermore, all examples and conditional language recited herein are principally intended expressly to be only for pedagogical purposes to aid the reader in understanding the principles of the disclosure and the concepts contributed by the inventor(s) to furthering the art, and are to be construed as being without limitation to such specifically recited examples and conditions.

Moreover, all statements herein reciting principles, aspects, and embodiments of the disclosure, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

Thus, for example, it will be appreciated by those skilled in the art that any block diagrams herein represent conceptual views of illustrative circuitry embodying the principles of the disclosure. Similarly, it will be appreciated that any flow charts, flow diagrams, state transition diagrams, pseudo code, and the like represent various processes which may be substantially represented in computer readable medium and so executed by a computer or processor, whether or not such computer or processor is explicitly shown.

The functions of the various elements shown in the Drawing, including any functional blocks that may be labeled as "processors", may be provided through the use of dedicated hardware as well as hardware capable of executing software in association with appropriate software. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor (DSP) hardware, network processor, application specific integrated circuit (ASIC), field programmable gate array (FPGA), read-only memory (ROM) for storing software, random access memory (RAM), and non-volatile storage. Other hardware, conventional and/or custom, may also be included.

Software modules, or simply modules which are implied to be software, may be represented herein as any combination of flowchart elements or other elements indicating performance of process steps and/or textual description. Such modules may be executed by hardware that is expressly or implicitly shown.

Unless otherwise explicitly specified herein, the figures comprising the drawing are not drawn to scale.

FIG. 1 depicts a schematic block diagram illustrating an eye tracking system according to aspects of the present disclosure. As will be apparent to those skilled in the art by inspection of this figure, such illustrative systems constructed according to aspects of the present disclosure exhibit substantial improvements in size, cost, power consumption, bandwidth and precision as compared with prior art eye-tracking systems.

In the depicted example, eye-tracking system 100 includes source module 102, photodetector module 104, and processor 106, among other elements (e.g., memory, power module, etc.).

Source module 102 includes light source 108 and scanner 110.

Light source 108 is a conventional light source configured for providing a suitable light signal to scanner 110. In the depicted example, light source 108 provides a light signal having approximately 1 mW of optical power at 940 nm. The light signal has a Full-Width-at-Half-Maximum (FWHM) divergence of approximately 20 degrees, which is collimated and redirected toward scanner 110 by an Off-Axis-Parabola (OAP) that is integrated in the package, as discussed below. After it reflects off the OAP, the light signal has a divergence of approximately 1-2 degrees. It should be noted, however, that light source 108 can be any of any variety known in the art without departing from the scope of the present disclosure.

Scanner 110 is a two-axis resonant MEMS-based scanning mirror that is configured to receive the light signal and scan it in a two-dimensional scan pattern over a region of an eye being tracked. As discussed in more detail below, scanner 110 includes first and second rotation axes, each of which is characterized by a resonant frequency, and each of which is driven with a periodic signal whose drive frequency is close to the resonant frequency of its respective axis. Emphasizing simple design principles according to the present disclosure, scanner 110 is preferably a two-axis, resonant micro-electromechanical system (MEMS) device having two orthogonal rotation axes.

Photodetector module 104 includes one or more non-imaging photodetectors configured to receive a portion of the light signal that is reflected from the eye region and provide output signal 112 to processor 106. In the depicted example, photodetector module 104 includes a single non-imaging, discrete photodetector. For the purposes of this disclosure, including the appended claims, a "discrete detector" is defined as an optoelectronic device having no more than four electrically independent detection regions on a single substrate, where each detection region is operative for providing one electrical signal whose magnitude is based on the intensity of light incident upon that detection region. Examples of discrete detectors include detectors having only one detection region, split detectors having two detection regions, four-quadrant detectors having four detection regions, and position-sensitive detectors. The definition of discrete detector explicitly excludes individual pixels, or groups of pixels, within array devices for collectively providing spatially correlated image information (i.e., imaging detectors), such as focal-plane arrays, image sensors, and the like.

In some embodiments, photodetector module 104 includes multiple non-imaging photodetectors that provide multiple output signals to the processor. Photodetector 104 can be any of any variety known in the art without departing from the scope of the present disclosure. Although the depicted example includes a photodiode module having a single photodiode, in some embodiments, multiple photodiodes are used to provide a richer data set for position of the eye.

As illustrated, processor 106 is communicatively coupled to scanner 110 via a number of signal lines namely, pwr, $V_\theta, V_\varphi, V_{pd}, V_{vcsel}$, and gnd, which correspond to electrical power, driving voltages ($\theta\varphi$) for MEMS diffractive optic element, driving voltages for photodetector and vertical cavity surface emitting laser (VCSEL) and ground signals respectively. Note that for simplicity, individual elements comprising the module(s) are not specifically shown in this illustrative figure namely, the MEMS scanning device, photodetector, VCSEL etc. Similarly, scanner 110 is communicatively coupled to light source 108 via pwr, gnd, and $V_{pd}$ signals. As we shall show and describe, the modules containing the scanner and photodetector are located and operated a physical distance apart from one another.

Processor 106 is a controller/processor configured to drive the components of source module 102 with appropriate drive signals, receive output signal 112 from photodetector module 104, and generate an estimate of the gaze vector of an eye being monitored with system 100 based on output signal 112, among other functions.

In some embodiments, processor 106 includes one or more components containing processing and control circuitry that can include hardware structured to execute functions in accordance with the present disclosure. In some embodiments, such circuitry can include machine-readable media for configuring the hardware to execute the functions described herein. Furthermore, the processing circuitry of processor 106 can be embodied as one or more circuitry components including, but not limited to, processing circuitry, network interfaces, peripheral devices, input devices, output devices, sensors, etc. In some embodiments, such processing circuitry can take the form of one or more analog circuits, electronic circuits (e.g., integrated circuits (IC), application-specific integrated-circuits (ASICs), discrete circuits, system on a chip (SOCs) circuits, etc.), telecommunication circuits, hybrid circuits, and any other type of "circuit," or combinations thereof. In this regard, "processing circuitry" can include one or more of any type of component for accomplishing or facilitating achievement of operations in accordance with the present disclosure. For example, a circuit as described herein can include one or more transistors, logic gates (e.g., NAND, AND, NOR, OR, XOR, NOT, XNOR, etc.), resistors, multiplexers, registers, capacitors, inductors, diodes, wiring, and so on).

"Processing circuitry" can also include one or more processors and/or controllers communicably coupled to one or more memory or memory devices. In this regard, the one or more processors can execute instructions stored in the memory or can execute instructions otherwise accessible to the one or more processors. In some embodiments, the one or more processors can be embodied in various ways. The one or more processors can be constructed in a manner sufficient to perform at least the operations described herein. In some embodiments, the one or more processors can be shared by multiple circuits (e.g., circuit A and circuit B can comprise or otherwise share the same processor which, in some example embodiments, can execute instructions stored, or otherwise accessed, via different areas of memory). Alternatively, or additionally, the one or more processors can be structured to perform or otherwise execute certain operations independent of one or more co-processors. In other example embodiments, two or more processors can be coupled via a bus to enable independent, parallel, pipelined, or multi-threaded instruction execution. Each processor can be implemented as one or more general-purpose processors, application specific integrated circuits (ASICs), field programmable gate arrays (FPGAs), digital signal processors (DSPs), or other suitable electronic data processing components structured to execute instructions provided by memory. The one or more processors can take the form of a single core processor, multi-core processor (e.g., a dual core processor, triple core processor, quad core processor, etc.), microprocessor, etc. In some embodiments, the one or more processors can be external to the apparatus, for example the one or more processors can be a remote processor (e.g., a cloud-based processor). Alternatively, or additionally, the one or more processors can be internal and/or local to the apparatus. In this regard, a given circuit or components thereof can be disposed locally (e.g., as part of a local server, a local computing system, etc.) or remotely (e.g., as part of a remote server such as a cloud-based server). To that end, processing circuitry in accordance with the present disclosure can include components that are distributed across one or more locations.

The present disclosure contemplates methods, systems and program products on any machine-readable media for accomplishing various operations. The embodiments of the present disclosure can be implemented using existing computer processors, or by a special purpose computer processor and/or controller for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, CD-ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. Combinations of the above are also included within the scope of machine-readable media. Machine-executable instructions include, for example, instructions and data which cause a general-purpose computer, special purpose computer, or special purpose processing machines to perform a certain function or group of functions.

Figure 2:
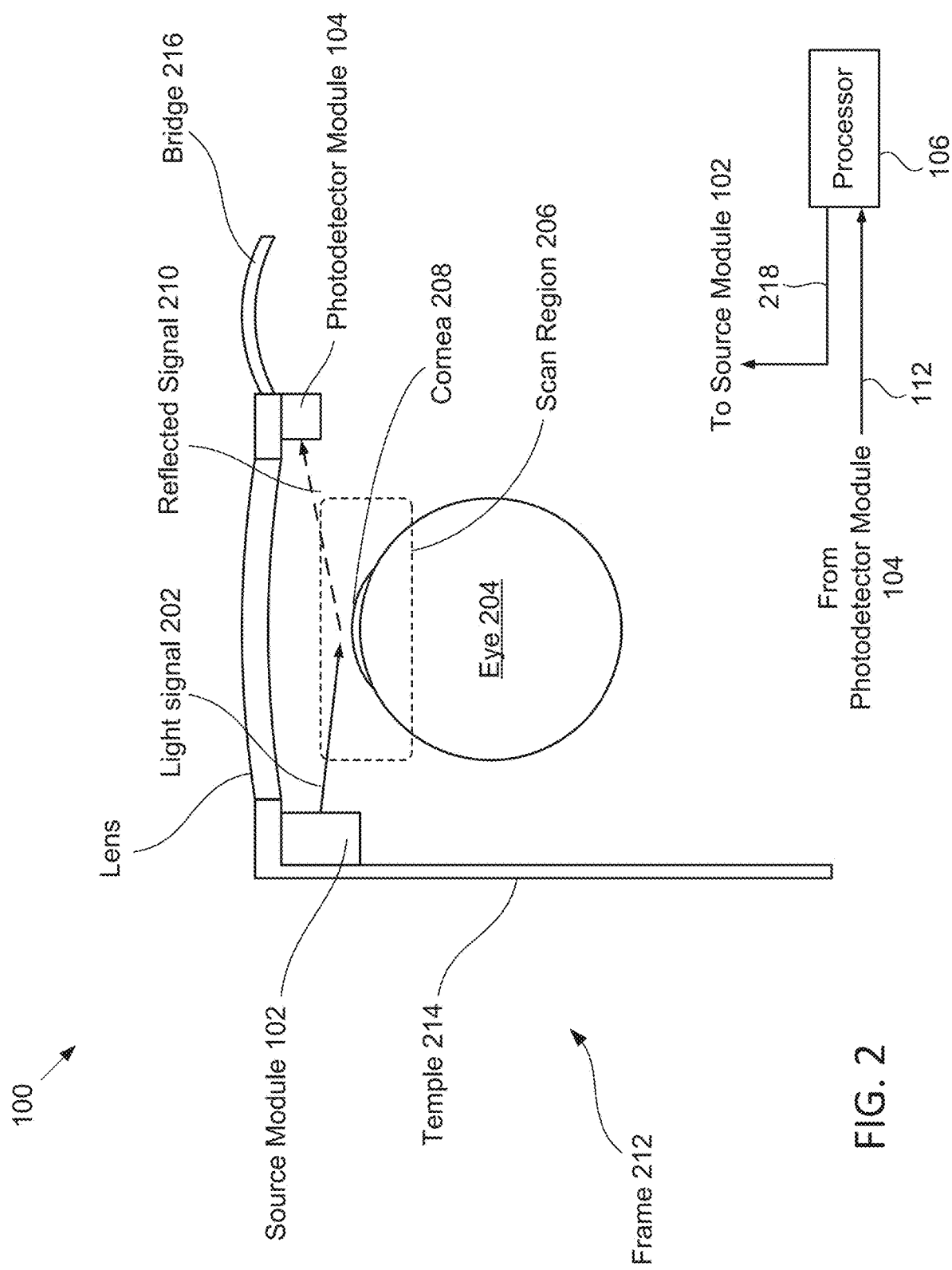
FIG. 2 depicts a schematic drawing of an exemplary operational eye-tracking geometry for system 100.

FIG. 2 depicts a schematic drawing of an exemplary operational eye-tracking geometry for system 100. Some eye-tracker system geometries according to aspects of the present disclosure include a MEMS scanner that sweeps a beam of light in a two-dimensional scan pattern over a region of an eye (typically the region containing the cornea) and a photodetector that receives light reflected from the region.

In the depicted example, source module 102 is mounted to temple 214 of eyeglass frame 212, while photodetector module 104 is mounted to the frame 212 near bridge 216.

Light source 108 emits light signal 202, which is steered by scanner 110 such that the light signal is scanned over scan region 206. In the depicted example, scan region 206 includes cornea 208; however, in some embodiments, a scan region includes a different surface feature of the eye.

The scan pattern generated by source module 102 is based on drive signals 218, which are provided by processor 106 to the rotation axes of scanner 110. As discussed below in more detail, each axis of scanner 110 is characterized by a resonant frequency and driven with a periodic signal having a drive frequency that is based on that resonant frequency. Those skilled in the art will appreciate that periodic drive signals provided to each axis of scanner 110 gives rise to a scan pattern that is substantially a Lissajous curve (also known as a Lissajous figure), which is the graph of a system of parametric equations defined by x=A sin sin (at+δ) ;y=B sin sin (bt).

Optical energy of light signal 202 is reflected from the surface of cornea 208 at a glancing angle (~60 degrees to the normal) onto photodiode module 104 as reflected signal 210. As eye 204 rotates, the intensity of reflected signal 210 changes as a function of the position of a unique point on cornea 208, thereby enabling a system according to aspects of the present disclosure to track position of this point and, as a consequence, the position of the cornea. Notably, the surface area of the photodiode acts as a spatial filter to remove any high frequencies from the far-field pattern projected by the scanner.

Photodetector module 104 detects reflected signal 210 and provides corresponding output signal 112 to processor 106, which generates an estimate of the gaze vector of the eye based on the output signal.

Figure 3:
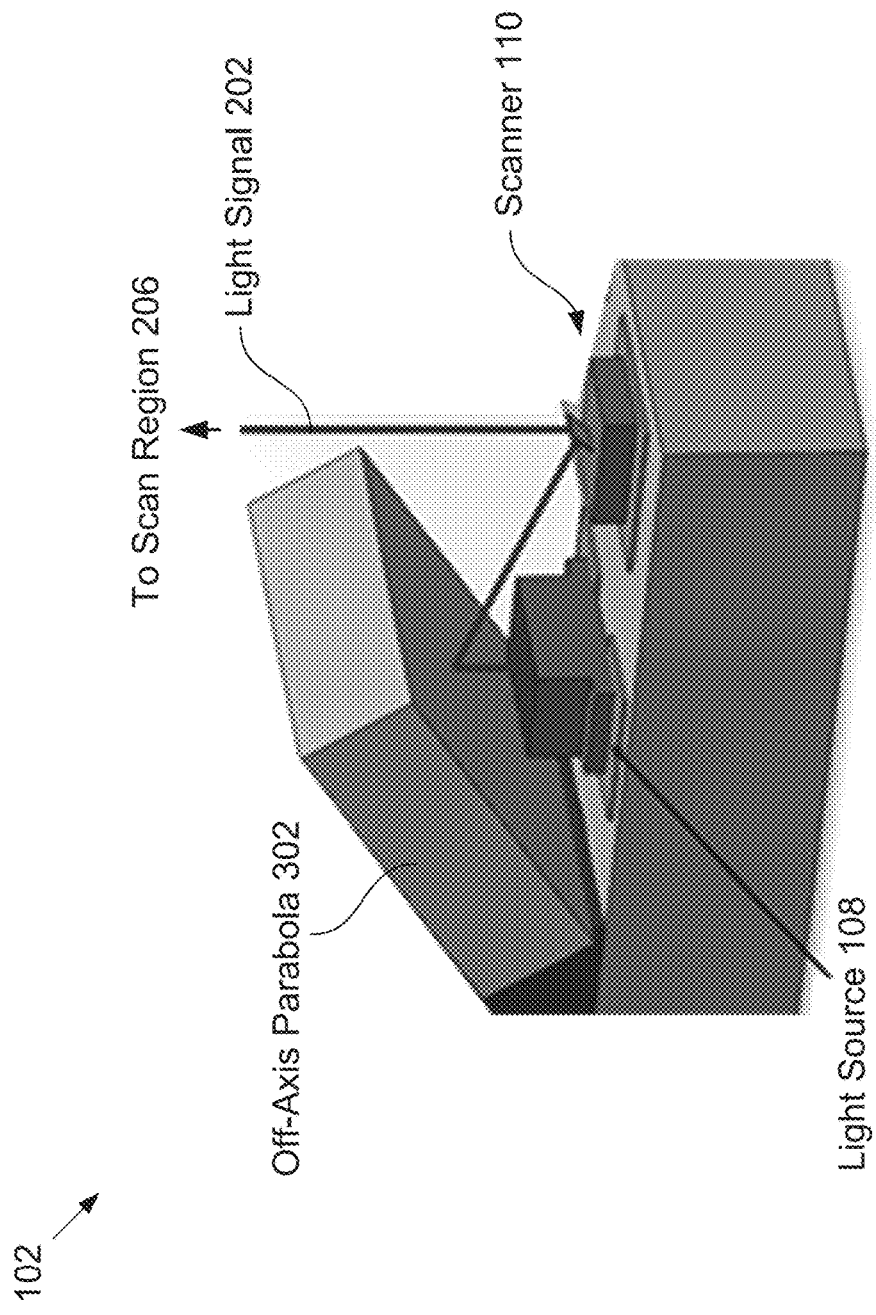
FIG. 3 depicts a schematic drawing of a perspective view of a source module in accordance with the present disclosure.

FIG. 3 depicts a schematic drawing of a perspective view of a source module in accordance with the present disclosure. Source module 102 comprises source 108, OAP 302, and scanner 110.

OAP 302 is a reflective optical element that is configured to reduce the FWHM of light signal 112 and redirect it toward scanner 110 without significant loss. In some embodiments, OAP 302 is not included in source module 102. In some embodiments, source module 102 includes a flat mirror rather than an OAP.

Figure 4:
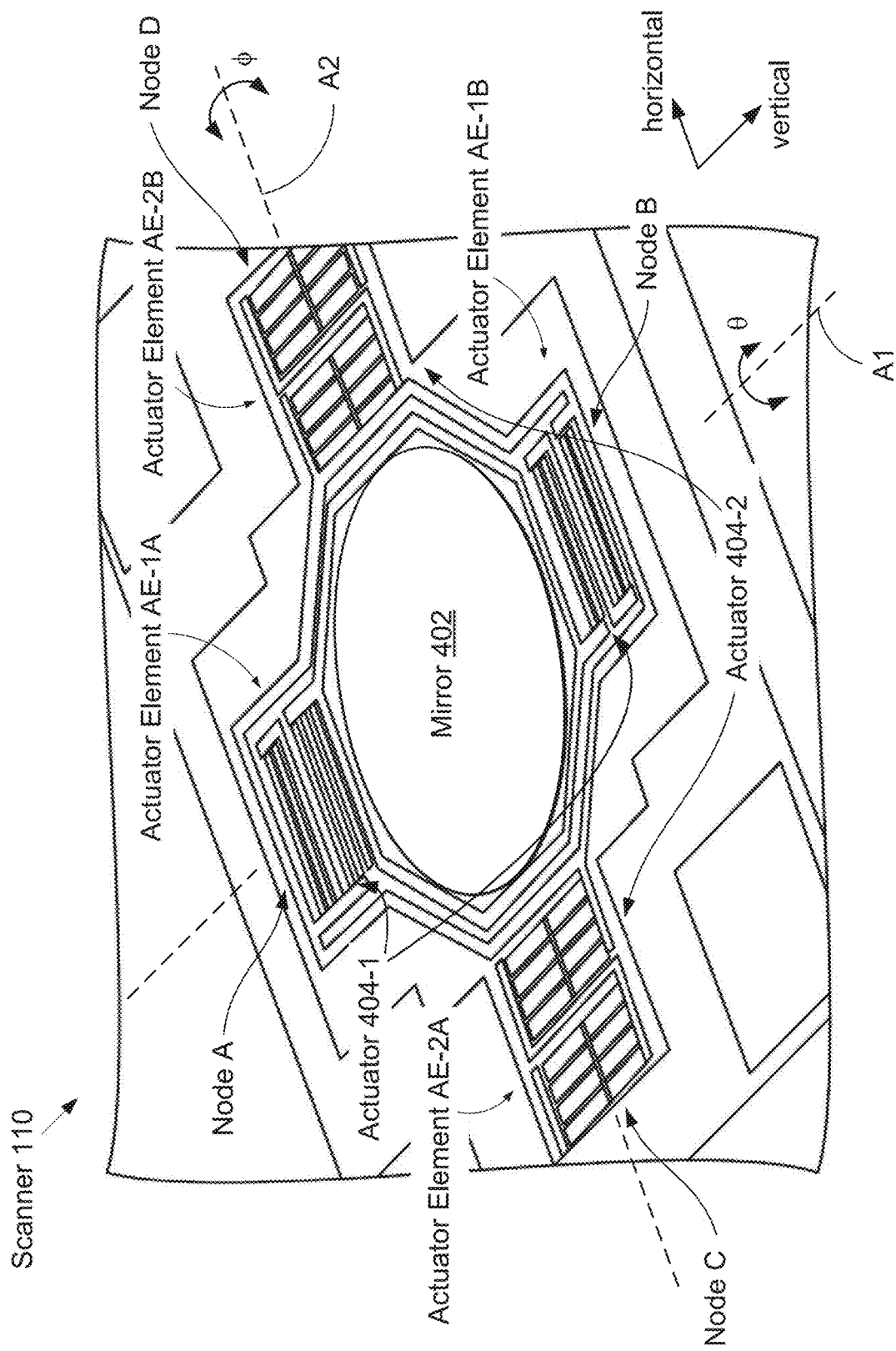
FIG. 4 depicts a schematic drawing of a perspective view of a scanner in accordance with the present disclosure.

FIG. 4 depicts a schematic drawing of a perspective view of a scanner in accordance with the present disclosure. Scanner 110 is a two-axis, resonant scanning mirror with two isothermal axes that is manufactured in a CMOS process. When applied to such a device, CMOS-compatible voltages can generate 90° (mechanical) deflections in both axes. As may be observed from FIG. 4, the scanner geometry includes mirror 402 and actuators 404-1 and 404-2.

In the depicted example, mirror 402 is a substantially flat first-reflector surface formed on a structurally rigid plate that is operatively coupled with actuators 404-1 and 404-2 to enable its rotation about two orthogonal axes to steer light signal 202 in a desired pattern. Although the depicted example comprises a plane mirror, in some embodiments, scanner 110 includes a different optical element, such as a Fresnel zone plate as its optical element. As will be apparent to one skilled in the art, after reading this Specification, scanner 110 can include any suitable optical element for steering a light signal without departing from the scope of the present disclosure. Examples of alternative optical elements suitable for use in accordance with the present disclosure include, without limitation, other diffractive elements (e.g., holograms, Dammann gratings, etc.), refractive elements, lenses, and the like.

Each of actuators 404-1 and 404-2 comprises a pair of actuator elements that are located on opposite sides of mirror 402. Actuator 404-1 includes actuator elements AE-1A and AE-1B, which are opposed serpentine, silicon-based, thermal actuators that collectively define rotation axis A1. In similar fashion, actuator 404-2 includes actuator elements AE-21A and AE-2B, which are opposed serpentine thermal-actuators that collectively define rotation axis A2.

Actuator 404-1 is configured to impart rotation θ about rotation axis A1 in response to drive signal 218-1 from processor 106, while actuator 404-2 is configured to impart rotation φ about rotation axis A2 in response to drive signal 218-2 from processor 106. In the depicted example, scanner 110 is configured such that actuator 404-1 scans light signal 202 in the horizontal scan direction and actuator 404-2 scans light signal 202 in the vertical scan direction.

The structure of actuator 404-1 defines resonant frequency $f_{R1}$ for rotation axis A1, while the structure of actuator 404-2 defines resonant frequency $f_{R2}$ for rotation axis A2.

Operationally, to rotate the scanner reflector, the temperature of one actuator is increased, while the opposed actuator's temperature is decreased proportionally, thereby operating isothermally. In the depicted example, each of actuators 404-1 and 404-2 is driven with a single pulse-width modulated (PWM) channel per axis.

In some embodiments, at least one actuator of a scanner is not an isothermal actuator. In some embodiments, at least one of actuators 404-1 and 404-2 comprises an actuator other than a thermal actuator, such as an electrostatic comb-drive actuator, parallel plate electrostatic actuator, piezoelectric actuator, electromagnetic actuator, and the like.

It should be noted that mirror 402 and actuators 404-1 and 402-2 are merely exemplary and a wide range of and/or CMOS-MEMS actuators can be used in scanner 110 without departing from the scope of the present disclosure. Examples of alternative scanning elements and rotary actuators suitable for use in accordance with the present disclosure are described in detail in, for example, U.S. Pat. Pub. Nos. 20180210547, 20150047078, 20160166146, and 20190204913, each of which is incorporated herein by reference.

As will be apparent to one skilled in the art, the scan pattern generated by a two-axis resonant system whose axes are driven at their respective (different) resonant frequencies can be modeled as a sinusoidal function of time in each of its axes—referred to as a Lissajous curve. Furthermore, one skilled in the art will recognize, after reading this Specification, that the shape and density of such a curve is determined primarily by the ratio between these resonant frequencies.

In the depicted example, mirror 402 is electrically grounded and resonant two-dimensional scanning of the mirror is realized by applying drive signal 218-1 to each of nodes A and C, and drive signal 218-2 to each of nodes B and D. Drive signal 218-1 has a drive frequency that is based on the resonant frequency $f_{R1}$ of rotation axis A1, while drive signal 218-2 has a drive frequency that is based on the resonant frequency $f_{R2}$ of rotation axis A2.

Figure 5:
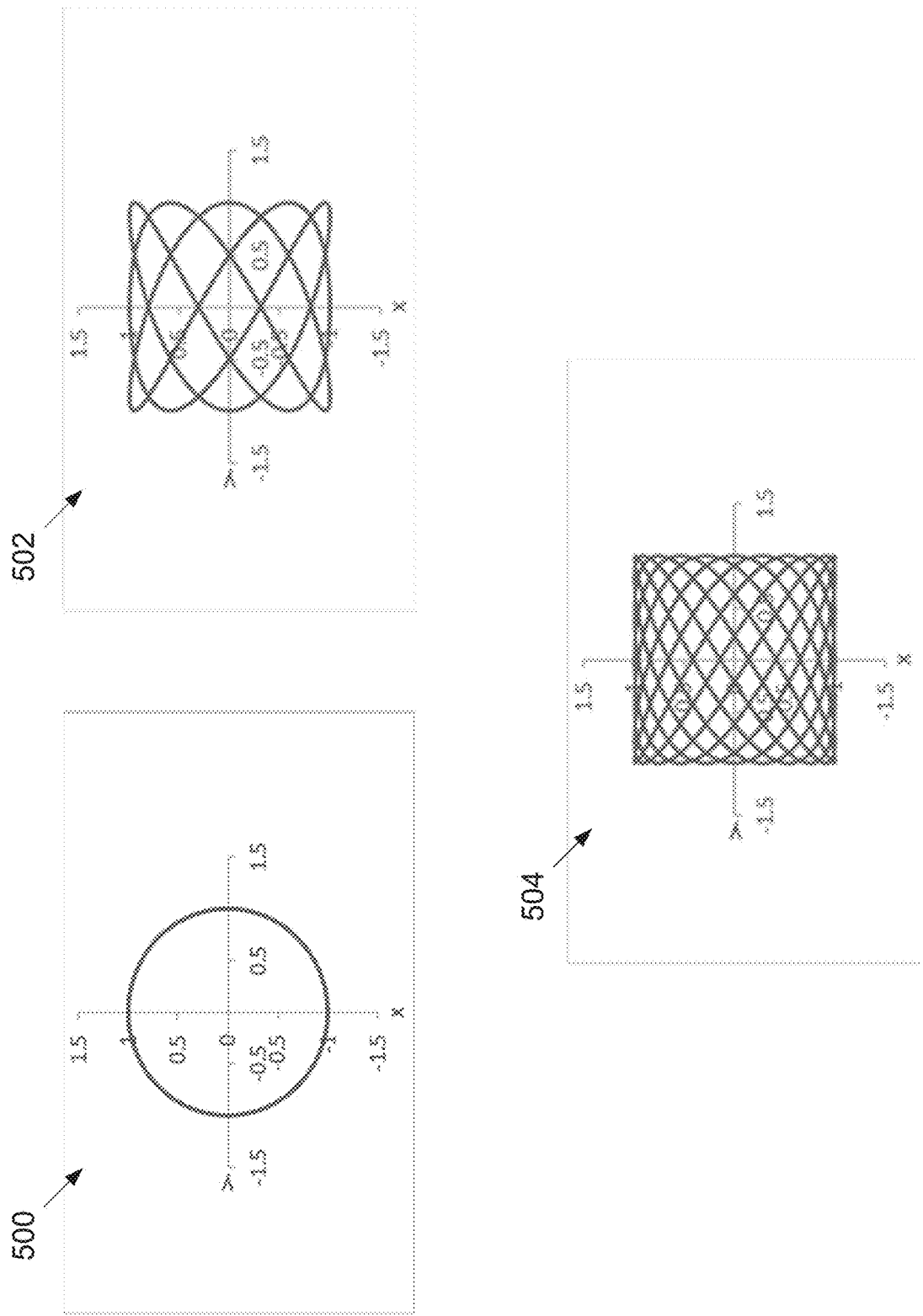
FIG. 5 depicts examples of Lissajous patterns generated by two-axis resonant scanners having different resonant frequency ratios.

FIG. 5 depicts examples of Lissajous patterns generated by two-axis resonant scanners having different resonant frequency ratios. Plots 500, 502, and 504 show Lissajous curves generated by scanner 110 driven on resonance using drive signals 218-1 and 218-2 whose drive frequencies have resonant frequency ratios of 1:1, 3:5, and 7:11, respectively, for multiple periods of the drive frequencies.

As would be apparent to one skilled in the art, each of the Lissajous curves depicted in FIG. 5 constitutes a plurality of paths, each path being traced during a different period (i.e., cycle) of the lower frequency of the pair of drive frequencies. As a result, many periods of the drive signals are necessary to achieve a high-density pattern, such as that shown in plot 504. It is an aspect of the present disclosure that many eye-tracking applications benefit from a low-density pattern that is generated at a high rate, which can serve to capture high-frequency movements of an eye.

It should be noted that, since a Lissajous curve is defined via two periodic functions, a Lissajous pattern traced out over time (e.g., over many cycles of the drive frequencies) will also be periodic if, and only if, the ratio between the drive frequencies of drive signals 218-1 and 218-2 is a rational number.

Any Lissajous pattern of a given frequency ratio can be re-analyzed as being a precessing form of a different Lissajous pattern with a simpler rational frequency ratio. For example, a Lissajous pattern formed using a drive-frequency ratio of 800:401 is substantially a precessing form of a Lissajous pattern formed using a drive-frequency ratio of 2:1. However, the precession rate of such a pattern would normally be too slow for use in many applications. It is an aspect of the present disclosure, however, that suitable drive frequencies can be identified using methods analogous to those described below.

Figure 6:
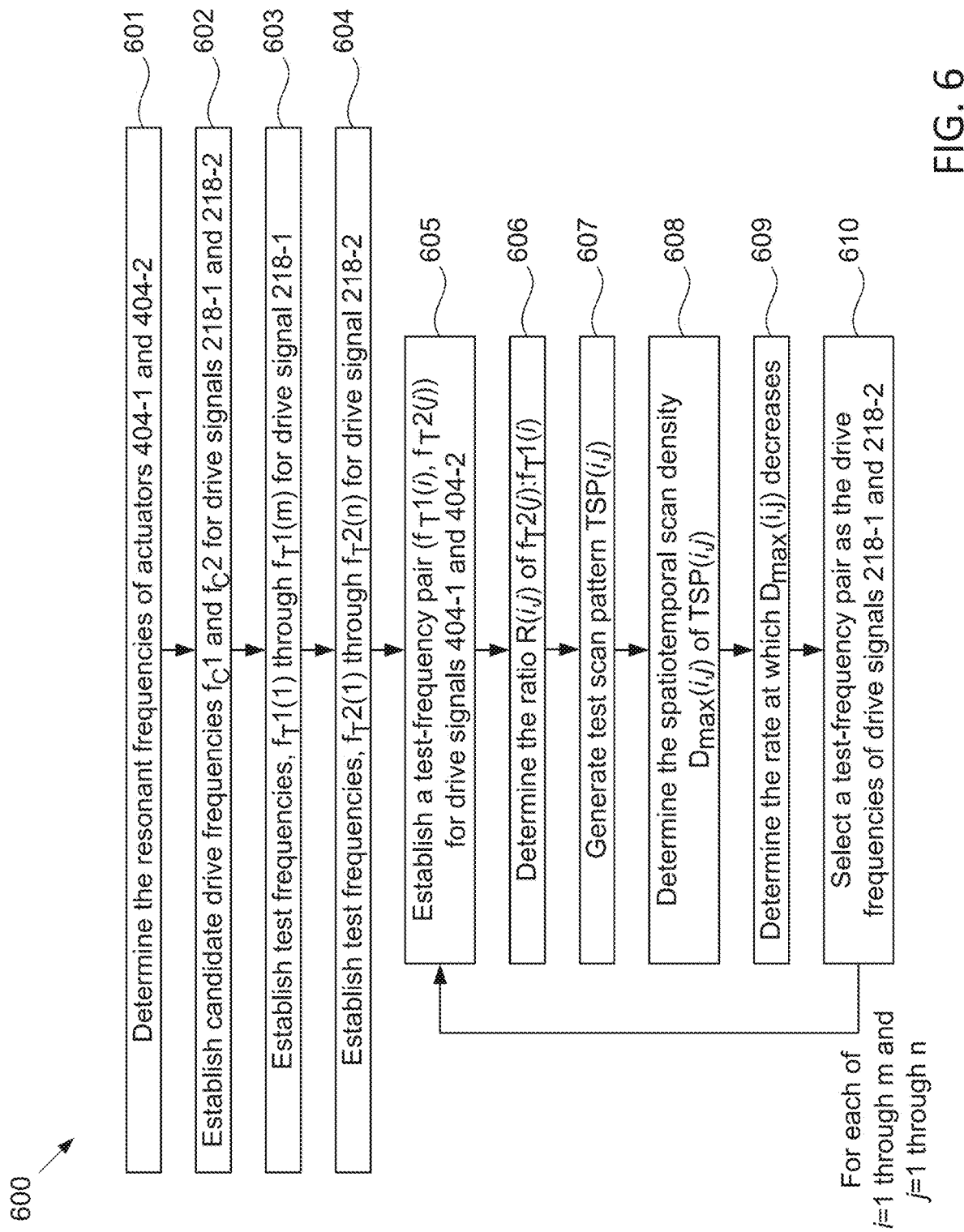
FIG. 6 depicts operations of a method suitable for achieving a scan pattern having high spatial density and low latency in accordance with the present disclosure.

FIG. 6 depicts operations of a method suitable for achieving a scan pattern having high spatial density and low latency in accordance with the present disclosure. Method 600 is described herein with reference to system 100 and continuing reference to FIGS. 1-4; however, methods in accordance with the present disclosure are suitable for use with a wide range of two-axis resonant scanning systems.

Method 600 begins with optional operation 601, wherein resonant frequencies $f_R1$ and $f_R2$ of axes A1 and A2, respectively, are determined. As discussed in the parent application, the resonant frequencies of axes A1 and A2 can be estimated from the physical structure of actuators 404-1 and 404-2; however, it is an aspect of the present disclosure that resonant frequencies $f_R1$ and $f_R2$ can be directly determined by measuring the resistance of at least a portion of one of the actuators. Furthermore, since a resistance measurement can be performed rapidly, the teachings of the present disclosure enable direct measurement of one or both resonant frequencies throughout the lifetime of a scanner. As a result, the drive frequencies of drive signals 218-1 and 218-2 can be changed as needed to accommodate changes in resonant frequencies $f_R1$ and $f_R2$ due to, for example, aging, package effects, thermal drift, and the like.

Figure 7A:
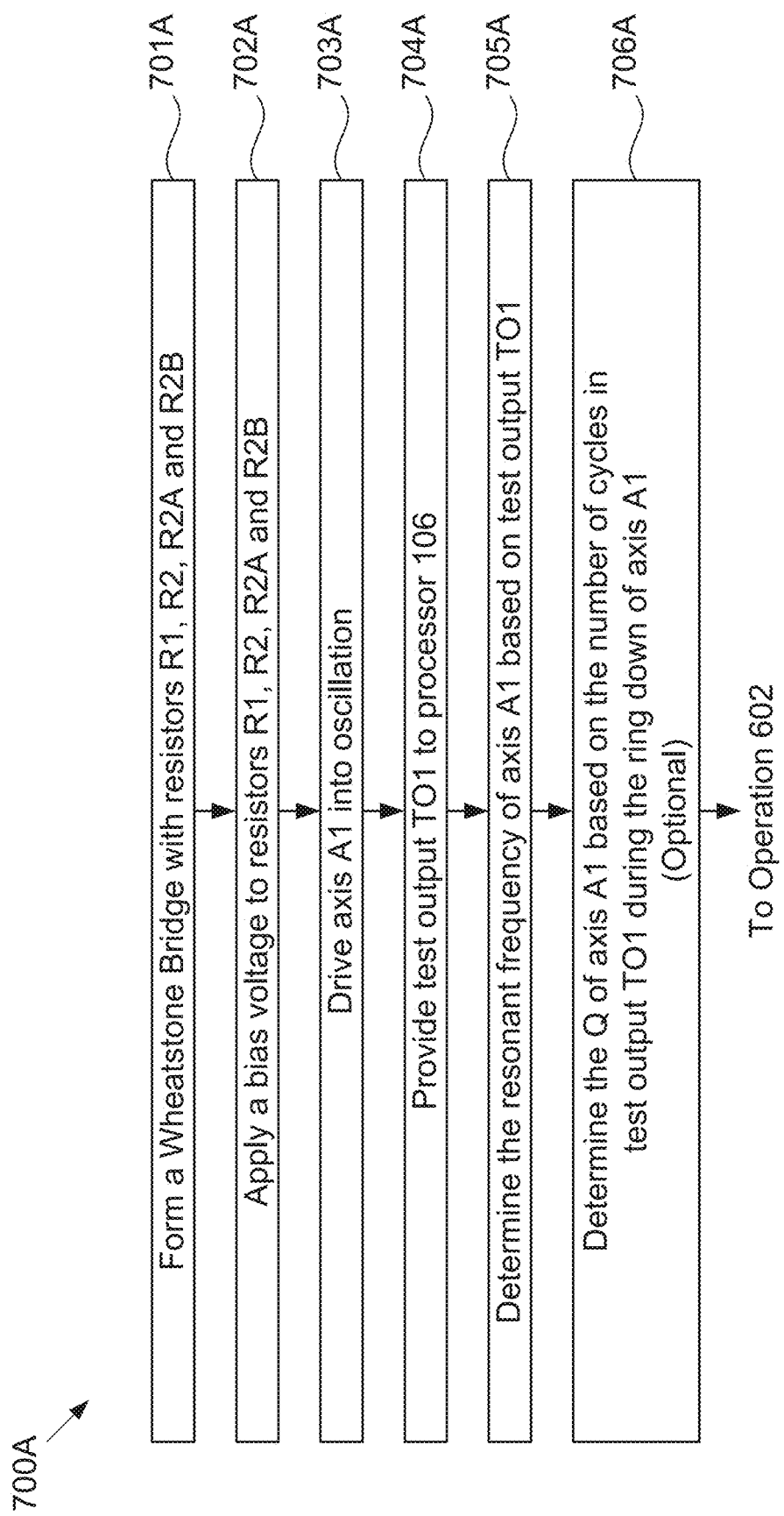
FIG. 7A depicts sub-operations of a first exemplary sub-method for determining the resonant frequencies of one axis of a two-axis scanning mirror in accordance with the present disclosure.

FIG. 7A depicts sub-operations of a first exemplary sub-method for determining the resonant frequencies of one axis of a two-axis scanning mirror in accordance with the present disclosure. Sub-method 700A is described with continuing reference to FIGS. 1-4 and additional reference to FIG. 8A.

Figure 8A:
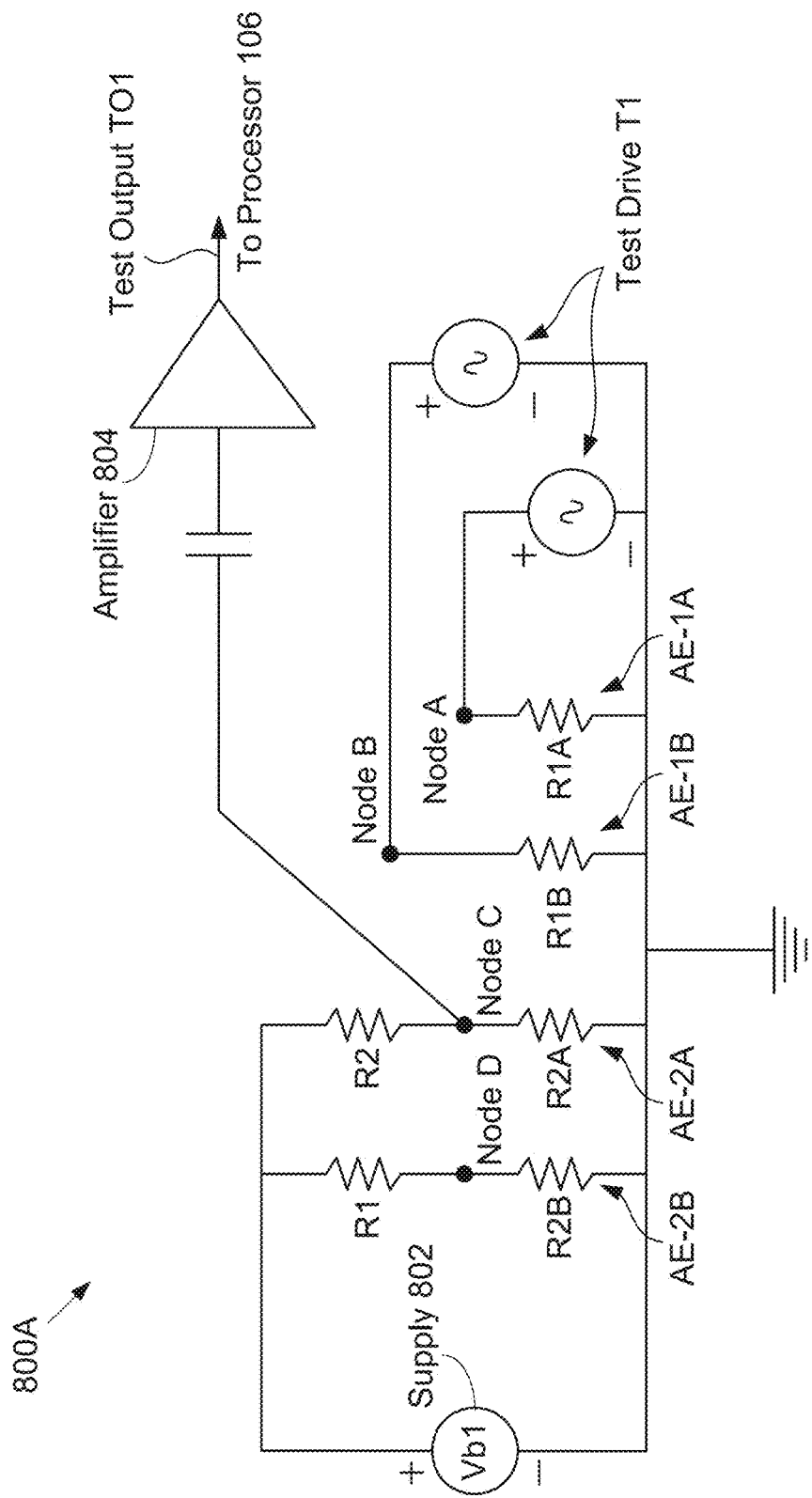
FIG. 8A depicts a schematic drawing of a first exemplary circuit suitable for use determining the resonant characteristics of an axis of a two-axis scanner in accordance with the present disclosure.

FIG. 8A depicts a schematic drawing of a first exemplary circuit suitable for use determining the resonant characteristics of an axis of a two-axis scanner in accordance with the present disclosure.

As noted above, during normal operation drive signal 218-1 is applied to each of nodes A and B of actuator elements AE-1A and AE-1B, respectively and drive signal 218-2 is applied to each of nodes C and D of actuator elements AE-2A and AE-2B, respectively.

Sub-method 700A begins with sub-operation 701A, wherein nodes C and D, are disconnected from drive signal 218-2 and connected to resistors R1 and R2. As a result, resistors R1 and R2 and R2A and R2B (i.e., the resistances of actuator elements AE-2A and AE-2B, respectively) collectively define a Wheatstone bridge configuration.

At sub-operation 702A, voltage supply 802 applies bias voltage Vb1 to R1 and R2, resulting in a voltage at each of nodes C and D that is equal to one-half Vb1.

At sub-operation 703A, axis A1 is driven into oscillation by applying test drive T1 to nodes A and B. In the depicted example, test drive T1 is an impulse signal comprising a single current pulse. In some embodiments, the oscillation is induced by applying test drive T1 to only one actuator element of actuator 404-1. In some embodiments, test drive T1 is a different drive signal, such as a PWM signal whose drive frequency is swept through a range of frequencies that includes resonant frequency $f_{R1}$.

In response to test drive T1, axis A1 oscillates at its natural resonant frequency, $f_R1$, while the amplitude of the oscillation decreases during a "ring down" of the axis.

The oscillation of mirror 402 about axis A1 gives rise to sympathetic motion of axis A2, which creates airflow over actuator elements AE-2A and AE-2B. This airflow causes convective cooling of the actuator elements, which results in a change in resistances R2A and R2B due to the thermal coefficient of resistance of the material of the actuator elements.

As will be appreciated by one skilled in the art, after reading this Specification, the voltage at node C is indicative of resistance R2A of actuator element AE-2A.

At sub-operation 704A, the voltage at node C is amplified by amplifier 804 and provided to processor 106 as test output TO1.

At sub-operation 705A, processor 106 determines the resonant frequency of axis A1 based on test output TO1.

At optional sub-operation 706A, processor 106 determines the quality factor (Q) for axis A1 based on the number of cycles detected in test output TO1 during the ring down of the axis.

In some embodiments, other operational parameters of axis A1 are determined during sub-method 700A, such as the quiescent values of resistors R1A and R1B, the phase offset of axis A1 at resonance when driven by a periodic drive signal at its resonant frequency, the angular range of motion of mirror 402 about axis A1, and the like.

Once the desired characteristics of axis A1 have been determined, sub-method 700A is repeated for axis A2 by simply reversing the electrical connectivity of nodes A, B, C, and D.

Figure 7B:
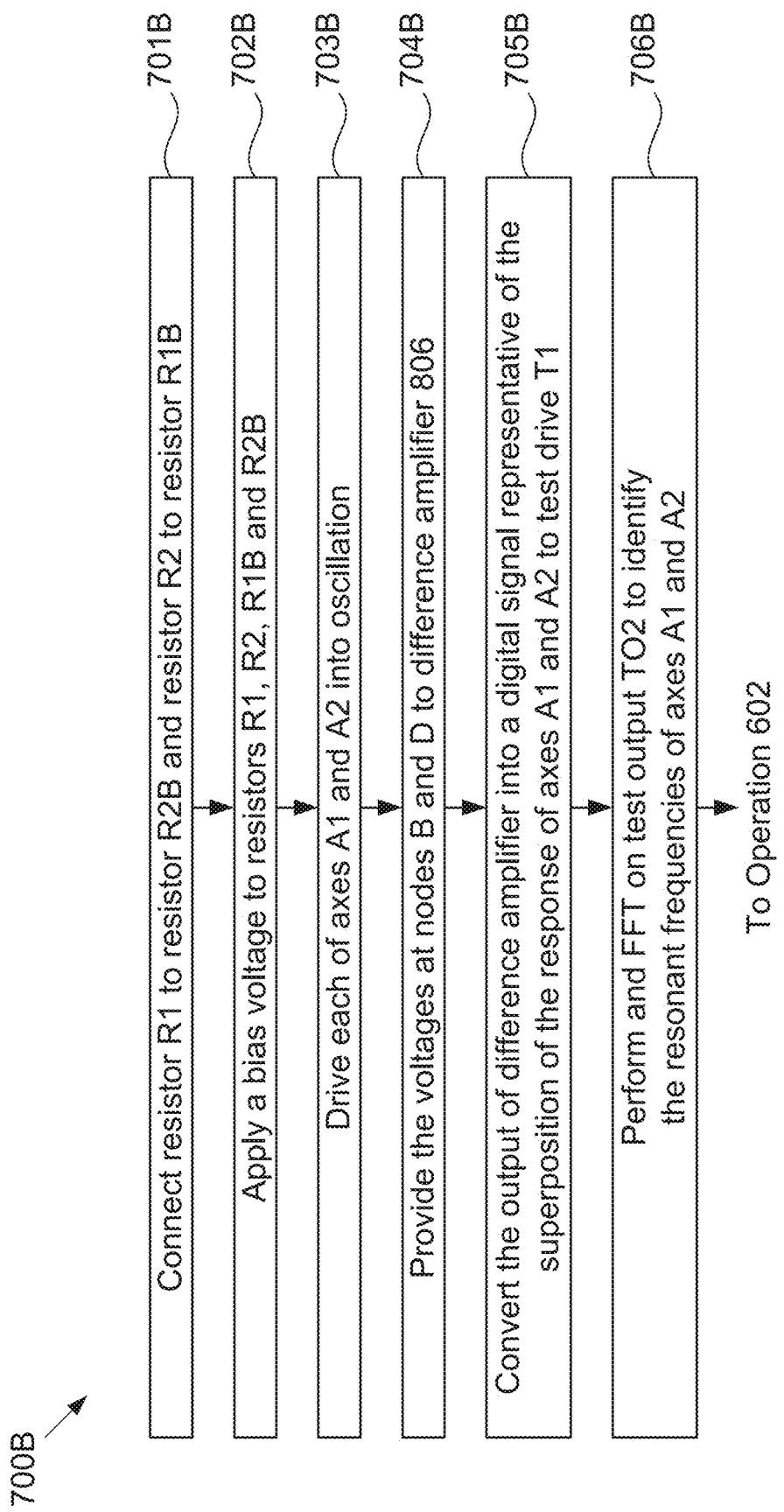
FIG. 7B depicts sub-operations of an exemplary sub-method for determining the resonant frequencies of both axes of a two-axis scanning mirror in accordance with the present disclosure.

FIG. 7B depicts sub-operations of an exemplary sub-method for determining the resonant frequencies of both axes of a two-axis scanning mirror in accordance with the present disclosure. Sub-method 700B is described with continuing reference to FIGS. 1-4 and additional reference to FIG. 8B.

Figure 8B:
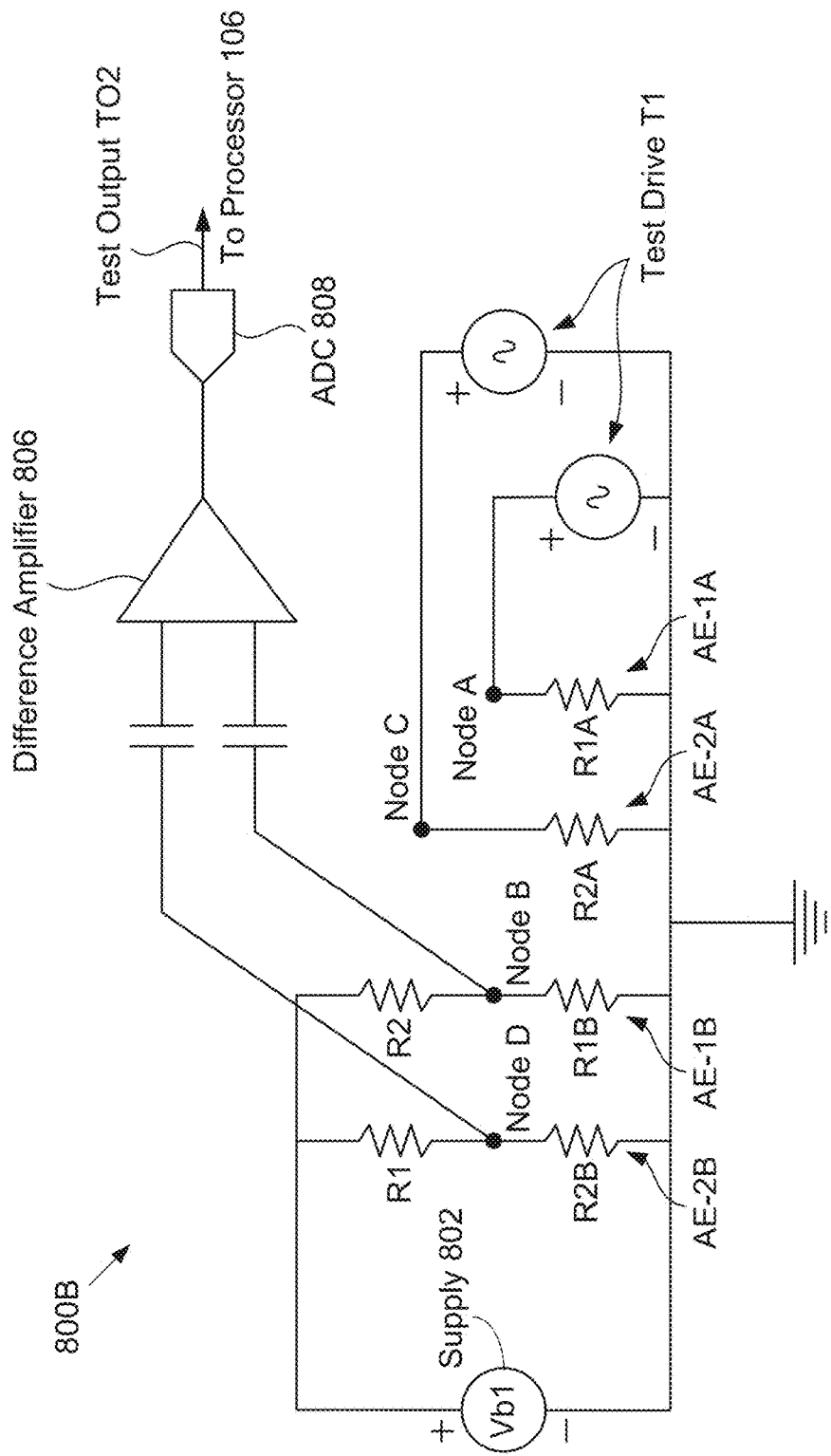
FIG. 8B depicts a schematic drawing of an exemplary circuit suitable for use determining the resonant characteristics of both axes of a two-axis scanner in accordance with the present disclosure.

FIG. 8B depicts a schematic drawing of an exemplary circuit suitable for use determining the resonant characteristics of both axes of a two-axis scanner in accordance with the present disclosure.

Sub-method 700B begins with sub-operation 701B, wherein nodes B and D are disconnected from drive signals 218-1 and 218-2 and connected to resistors R1 and R2, respectively.

At sub-operation 702B, voltage supply 802 applies bias voltage Vb1 to R1 and R2, resulting in a voltage at each of nodes B and D that is equal to one-half Vb1.

At sub-operation 703B, both of axes A1 and A2 are driven into oscillation by applying test drive T1 to nodes A and C. In the depicted example, test drive T1 is an impulse signal comprising a single current pulse.

In response to test drive T1, axes A1 and A2 oscillate at their natural resonant frequencies, $f_R1$ and $f_R2$, while the amplitude of their oscillations decreases as each axis rings down.

At sub-operation 704B, the voltages at nodes B and D are provided to the inputs of difference amplifier 806.

At operation 705B, the output of difference amplifier is fed into analog-to-digital converter (ADC) 808, which records the superposition of the two axes response to test drive T1 and provides it as test output TO2.

At operation 706B, processor 106 performs a Fast-Fourier Transform (FFT) on test output TO2, which generates two frequency signals at resonant frequencies $f_R1$ and $f_R2$.

In some embodiments, other operational parameters of axes A1 and A2 are determined during sub-method 700B, such as the Q of each axis, the quiescent values of resistors R1A and R1B, the phase offset of axes A1 and A2 at their resonances when driven by periodic drive signals at each of their resonant frequencies, the angular range of motion of mirror 402 about axes A4 and A2, and the like.

FIG. 7C depicts sub-operations of a second exemplary sub-method for determining the resonant frequencies of one axis of a two-axis scanning mirror in accordance with the present disclosure. Sub-method 700C is described with continuing reference to FIGS. 1-4 and additional reference to FIG. 8C.

Figure 8C:
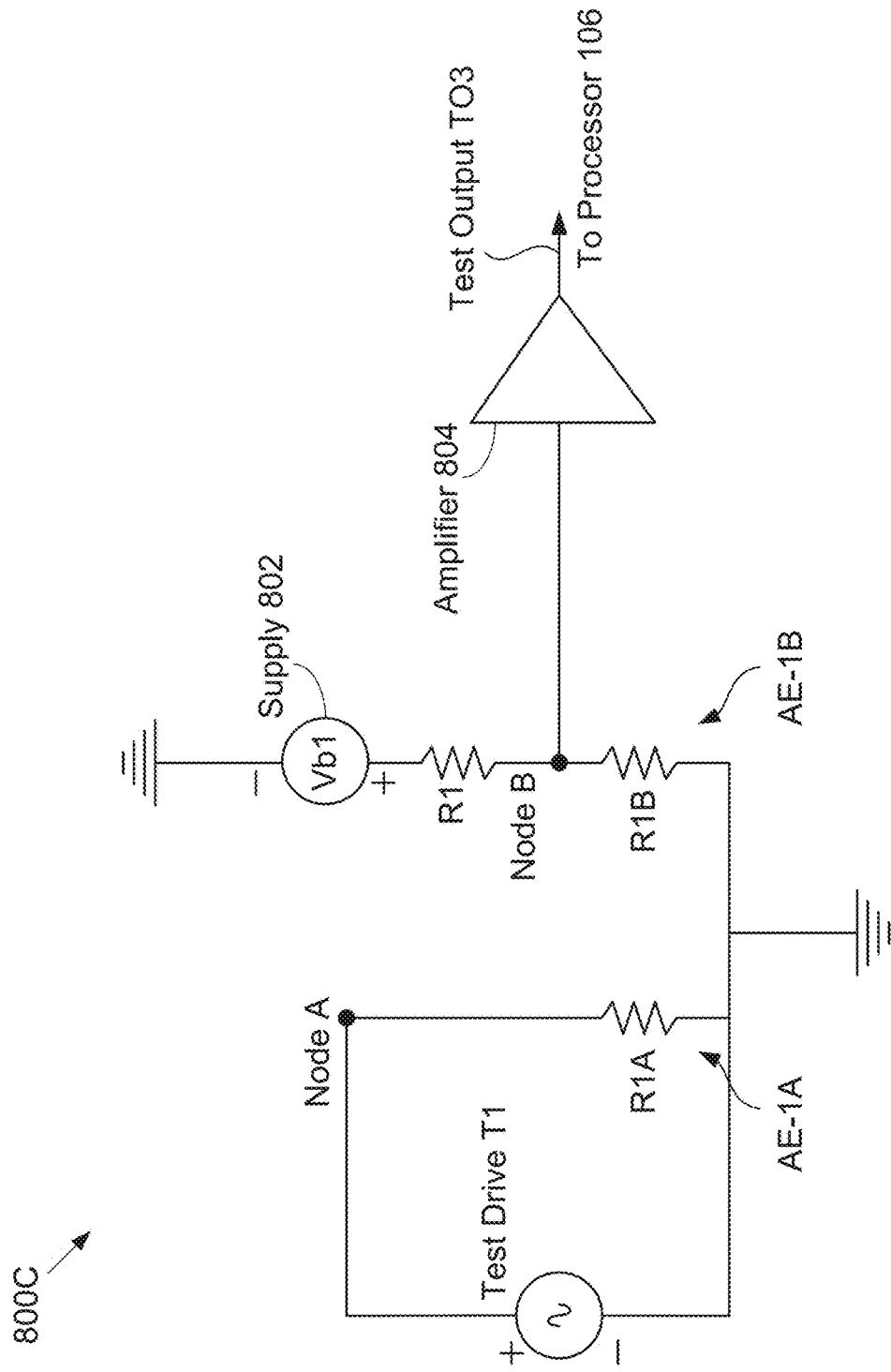
FIG. 8C depicts a schematic drawing of a second exemplary circuit suitable for use determining the resonant characteristics of an axis of a two-axis scanner in accordance with the present disclosure.

FIG. 8C depicts a schematic drawing of a second exemplary circuit suitable for use determining the resonant characteristics of an axis of a two-axis scanner in accordance with the present disclosure.

Sub-method 700C begins with sub-operation 701C, wherein node B is disconnected from drive signal 218-1 and connected to resistor R1.

At sub-operation 702C, voltage supply 802 applies bias voltage Vb1 to R1 and R1B (i.e., actuator element AE-1B), which sets node B to one-half Vb1.

At sub-operation 703C, axis A1 is driven into oscillation by applying test drive T1 to node A to drive just actuator element AE-1A. In the depicted example, test drive T1 is an impulse signal comprising a single current pulse.

In response to test drive T1, axis A1 oscillates at its natural resonant frequency, $f_R1$, while the amplitude of its oscillation decreases as axis A1 rings down after the impulse excitation.

The oscillation of mirror 402 about axis A1 induces commensurate strain in actuator element AE-1B and a change in its resistance R1B due to the piezoresistivity of its material.

At sub-operation 704C, the voltage at node B is amplified by amplifier 804 and provided to processor 106 as test output TO3.

At sub-operation 705C, processor 106 determines the resonant frequency of axis A1 based on test output TO3.

At optional sub-operation 706C, processor 106 determines the Q of axis A1 based on the number of cycles detected in test output TO3 during the ring down of the axis.

In some embodiments, other operational parameters of axis A1 are determined during sub-method 700C, such as the quiescent values of resistors R1A and R1B, the phase offset of axis A1 at resonance when driven by a periodic drive signal at its resonant frequency, the angular range of motion of mirror 402 about axis A1, and the like.

Once the desired characteristics of axis A1 have been determined, sub-method 700C is repeated for axis A2 using nodes C and D.

In some embodiments, scanner 110 includes a piezoresistor that is independent of the drive resistors in each of axes A1 and A2 and the resistance measured to indicate the resonant frequency of an axis is that of the piezoresistor.

It should be noted that the time required to determine the resonant characteristics of a two-axis scanner using electrical test methods in accordance with the present disclosure is very short (typically less than 0.5 seconds). As a result, the teachings herein enable quasi-closed-loop control of a two-axis resonant scanning mirror, wherein the frequencies of drive signals 218-1 and 218-2 can be periodically updated to accommodate changes in the resonant behavior of the scanner over time.

Furthermore, since the methods for determining the resonant characteristics of a scanner in accordance with the present disclosure are electrically based, they can be performed on a plurality of light scanners as a wafer-level test procedure using a simple probe system. As a result, the teachings of the present disclosure facilitate one-time calibration of fabricated devices, binning devices into performance groups, and the like.

It should be noted that sub-methods 700A, 700B, and 700C are merely examples of approaches for determining the resonance characteristics of one or more axes of a two-axis resonant scanner in accordance with the present disclosure.

Returning now to method 600, at operation 602, candidate frequencies $f_c1$ and $f_c2$ are established for axes A1 and A2, respectively. In the depicted example, candidate frequencies $f_c1$ and $f_c2$ are established by adding frequency offset FO1 to resonant frequency $f_R1$ and frequency offset FO2 to resonant frequency $f_R2$.

At operation 603, a set of first test frequencies $f_T1(1)$ through $f_T1(m)$ is established, where each first test frequency $f_T1(i)$ (for i=1 through m) is a frequency within a first frequency range, FR1, around candidate frequency $f_c1$ such that the candidate frequency is within the first frequency range.

At operation 604, a set of second test frequencies $f_T2(1)$ through $f_T2(n)$ is established, where each second test frequency $f_T2(j)$ (where j=1 through n) is a frequency within a second frequency range, FR2, around candidate frequency $f_c2$ such that the candidate frequency is within the second frequency range. In some embodiments, at least one set of test frequencies includes the resonant frequency and/or candidate frequency to which it corresponds.

In some embodiments, at least one of the sets of first and second test frequencies is generated based, in part, on other system parameters, such as the structure of the electronics used to drive an actuator, one or more reference clocks, capabilities of circuits included in processor 106 (e.g., phase-lock loops, timers, etc.), and the like.

FIG. 9 depicts plots showing representative sets of test frequencies for driving axes A1 and A2 in accordance with the present disclosure. Plot 900 shows exemplary frequency components for the resonant frequencies, candidate frequencies, and sets of test frequencies for identifying desired drive frequencies for drive signals 218-1 and 218-2.

For each of i=1 through m and j=1 through n:

At operation 605, establish test-frequency pair ($f_T1(i)$, $f_T2(j)$) for drive signals 218-1 and 218-2.

At operation 606 determine the ratio, R(i,j), of the second test frequency to the first test frequency test-frequency pair ($f_T1(i)$, $f_T2(j)$), where R(i,j) is $f_T2(j):f_T1(i)$.

At optional operation 607 generate a test scan pattern TSP(i,j) using test-frequency pair ($f_T1(i)$, $f_T2(j)$) as drive signals 218-1 and 218-2, respectively. In some embodiments, test scan pattern TSP(i,j) is generated by plotting it in phase space [$\psi_1(i)$, $\psi_2(j)$], for a plurality, P, of cycles (i.e., periods) of drive signal 218-1, where $\psi_1(i)$ is the phase of test frequency $f_T1(i)$ and $\psi_2(j)$ is the phase of test frequency $f_T2(j)$.

Figure 10B:
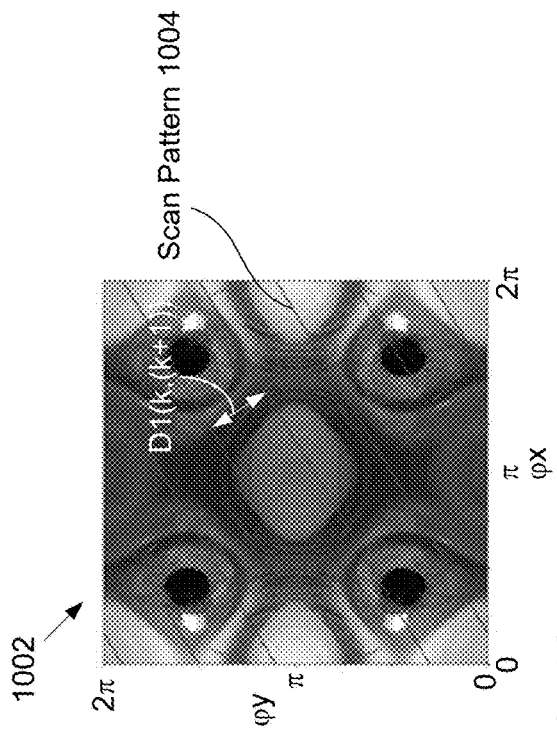
FIGS. 10A-B depict a representative Lissajous pattern plotted in scan space and phase space, respectively.
Figure 10A:
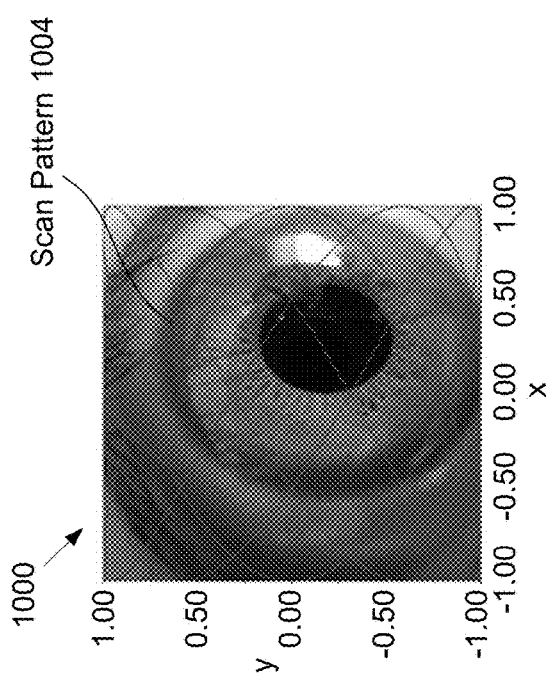

FIGS. 10A-B depict a representative Lissajous pattern plotted in scan space and phase space, respectively. Plots 1000 and 1002 show a Lissajous scan overlaying an image of scan region 206, where the Lissajous scan is generated with drive signals 218-1 and 218-2 having a frequency ratio of 3:5.

Plots 1000 and 1002 show Lissajous pattern 1004 overlaying an image of a scan region, where the pattern and scan region are plotted in scan space and phase space, respectively.

As seen from plot 1000, Lissajous pattern 1004 is highly complex when plotted in scan space; however, it is highly regular when plotted in phase space. In addition, when plotted in phase space, the Lissajous pattern forms a series of parallel lines, which, as they reach one side of plot 1002, wrap around to the other side. It should be noted that the slope of the parallel lines that manifest in phase space is directly related to the frequency ratio.

Figure 11B:
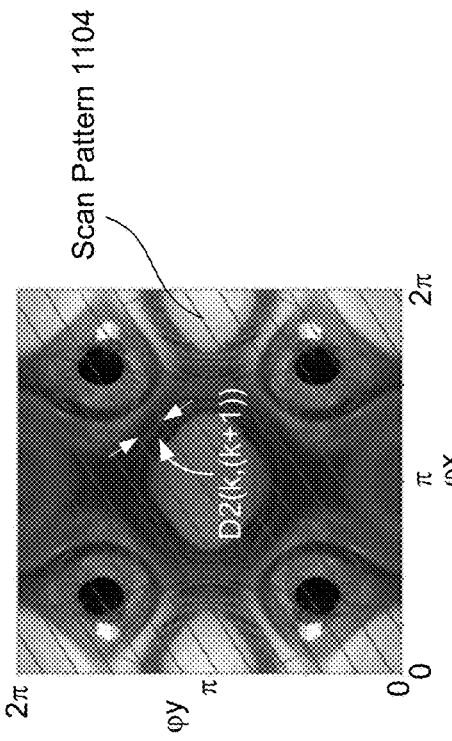
FIGS. 11A-B depict a representative Lissajous pattern plotted in scan space and phase space, respectively, where the Lissajous pattern is generated using drive signal having a frequency ratio of 7:11.
Figure 11A:
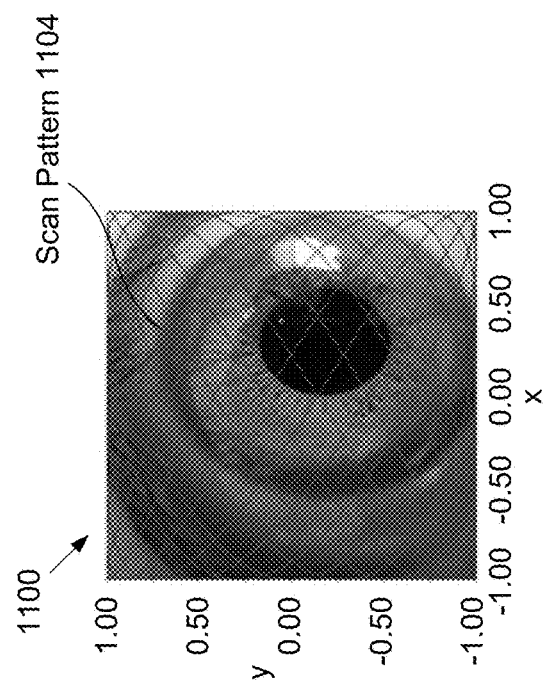

FIGS. 11A-B depict a representative Lissajous pattern plotted in scan space and phase space, respectively, where the Lissajous pattern is generated using drive signal having a frequency ratio of 7:11.

Plots 1100 and 1102 show a Lissajous scan overlaying an image of scan region 206, plotted in scan space and phase space, respectively, where the Lissajous pattern is generated with drive signals 218-1 and 218-2 having a frequency ratio of 7:11.

For any pair of test frequencies $f_T1(i)$ and $f_T2(j)$, the relationship between their respective phases $\psi_1(i)$ and $\psi_2(j)$ at any time, t, is given by the modulo equation:

$$\psi_2(j,t)=T(i,j)\psi_1(i,j)(\mod 2\pi),$$

which can be evaluated at every full cycle of $f_T1(i)$ resonance (i.e., when $\psi_1(i)$ is an integer multiple, p, of $2\pi$) as:

$$\psi_2[p]=2\pi R(i,j)p(\mod 2\pi).$$

At operation 608, the spatiotemporal scan density, SD(i,j) for test scan pattern TSP(i,j) is determined. In some embodiments, the scan density of test scan pattern TSP(i,j) is defined as the largest modulo $2\pi$ distance, $D_{max}(i,j)$, among pairs of scan lines adjacent in space, for a given finite sampling time.

It should be noted that is possible to recursively compute $D_{max}(i,j)$. As a result, in some embodiments, it is not necessary to actually generate a plot of a scan pattern in phase space to determine it and operation 607 is optional.

For example, the distance, $D\uparrow$, between the first scan line at t=0 and the closest scan line above it after k periods, for $f_T1(i)$ and $f_T2(j)$, can be expressed recursively as (temporarily neglecting the (i,j) notation for clarity):

$$D_\uparrow[0] = 2\pi$$
$$D_\uparrow[k] = \min(D_\uparrow[k-1], \mod(\psi_2[k], 2\pi))$$
$$= \min(D_\uparrow[k-1], \mod(2\pi Rk, 2\pi))$$
$$= \min(D_\uparrow[k-1], 2\pi\mod(Rk, 1)),$$

while the distance, between the first scan line and the adjacent scan line below it after k periods, can be expressed recursively as:

$$D_\downarrow[0] = 2\pi$$
$$D_\downarrow[k] = \min(D_\downarrow[k-1], \mod(-\psi_2[k], 2\pi))$$
$$= \min(D_\downarrow[k-1], \mod(-2\pi Rk, 2\pi))$$
$$= \min(D_\downarrow[k-1], 2\pi\mod(-Rk, 1)),$$

where the maximum gap size for test scan pattern TSP(i,j) at a given scan cycle, k, is simply the maximum of the two single-sided gap sizes:

$$D_{max}(i,j)[k]=\max(D\uparrow[k], D\downarrow[k]),$$

where $D_{max}[k]$ represents the spatiotemporal density of TSP(i,j), since it describes how dense the scan is after each iteration, k, of a period of test drive frequency $f_T1(i)$.

At operation 609, the rate at which $D_{max}(i,j)$ shrinks over time is determined. In some embodiments, this rate is determined by identifying a baseline value that $D_{max}(i,j)$ approaches after some number of drive-frequency cycles, and the number of cycles required to reach this baseline value.

Figure 12:
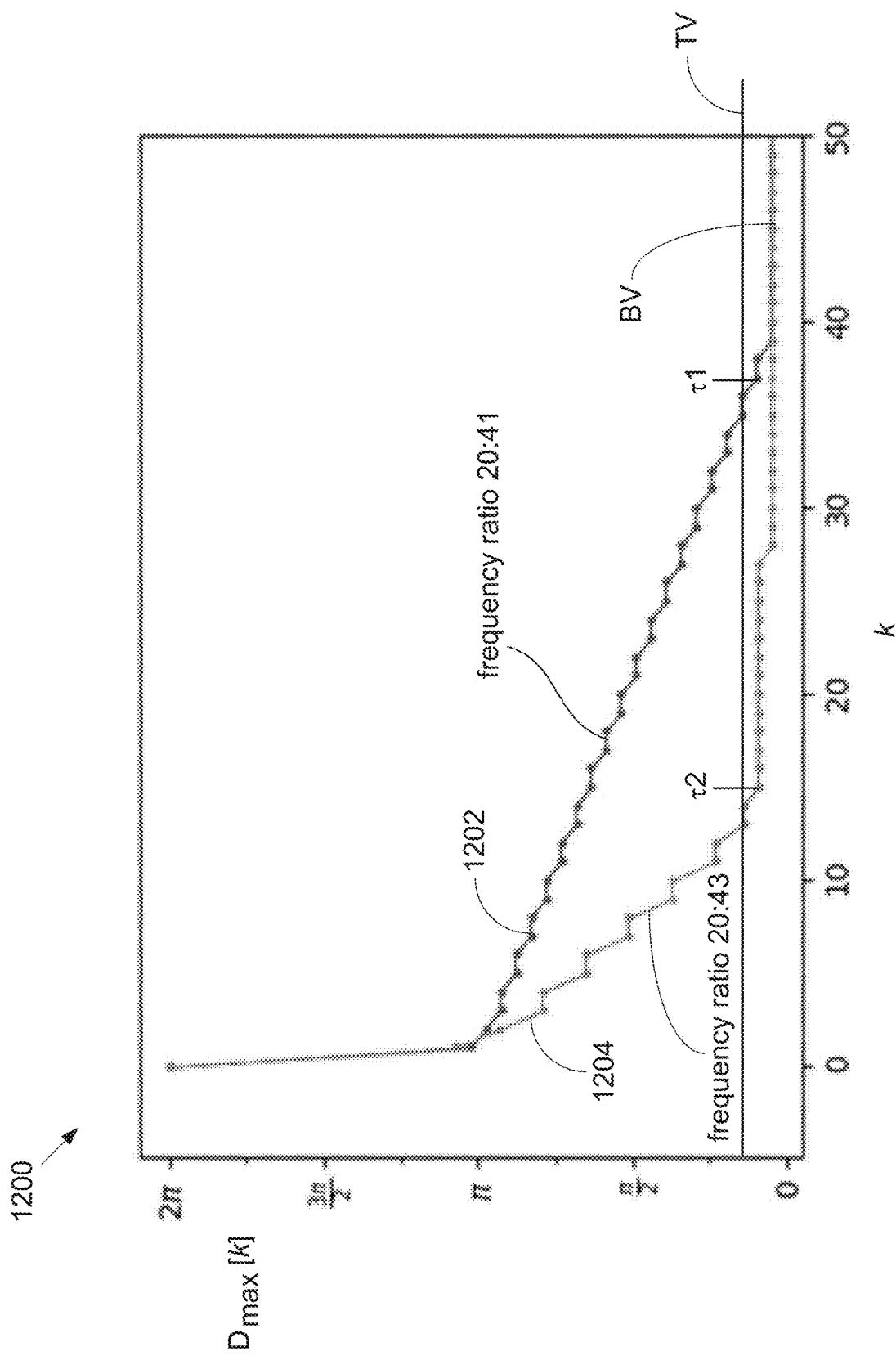
FIG. 12 depicts a plot of $D_{max}(i,j)[k]$ versus the number of drive-signal cycles, k, for a drive signal used to generate scan patterns generated using two different sets of test frequencies.

FIG. 12 depicts a plot of $D_{max}(i,j)[k]$ versus the number of drive-signal cycles, k, for a drive signal used to generate scan patterns generated using two different sets of test frequencies. Plot 1200 includes traces 1202 and 1204, which show the progression of the value of $D_{max}(i,j)$ over successive periods of drive signal 218-1 for test frequencies having 20:41 and 20:43 ratios, respectively. In some embodiments, the value of $D_{max}(i,j)$ is plotted over successive periods of drive signal 218-2.

Each of traces 1202 and 1204 are characterized by the same baseline value BV, which is equal to approximately $\pi/16$ in the depicted example. However, the conversion time, $\tau 2$, for the test-frequency pair having a ration of 20:43 (i.e., trace 1204) is significantly shorter than the conversion time, $\tau 1$, for the test-frequency pair having a ration of 20:41 (i.e., trace 1202). For the purposes of this Specification, including the appended claims, "conversion time" is defined as the time required for the largest modulo $2\pi$ distance of a scan pattern to reach a value that differs from its baseline value by less than a desired offset. In the depicted example, the desired offset is equal to $\pi/25$; however, any offset value can be used without departing from the scope of the present disclosure.

Specifically, plot 1200 shows that the drive-frequency ratio of 20:43 approaches baseline value BV in only 14 cycles of its test drive frequency $f_T1$, reaching this baseline value in only 28 cycles. In contrast, the drive-frequency ratio of 20:41 requires 38 cycles of its $f_T1$ to approach BV and 39 cycles to reach its base value. Alternatively, in some embodiments, threshold value TV is used as a metric in place of baseline value BV, where TV is a user-defined value for any of a wide range of eye-tracker system attributes. This is particularly advantageous when different drive-frequency ratios are characterized by different baseline values. In the depicted example, threshold value TV is used as a metric for a minimum acceptable spatial density for eye-tracking system 100.

In some embodiments, the suitability of a test-frequency pair is evaluated by determining the area under the trace of $D_{max}(i,j)$ versus successive periods of one of drive signals 218-1 and 218-2. For example, in plot 1200, the area under trace 1204 is smaller than the area under trace 1202; therefore, its drive-frequency ratio would typically be considered preferable to that used to generate trace 1202.

At operation 610, a test-frequency pair of the set of test-frequency pairs is selected as the drive frequencies of drive signals 218-1 and 218-2 based on at least one of:
i. the values determined for spatiotemporal scan densities SD(1,1) through SD(m,n); or
ii. the values of $\tau(1,1)$ through $\tau(m,n)$; or
iii. a plurality of data rates defined by the time for each of spatiotemporal scan densities SD(1,1) through SD(m,n) to become smaller than a user-selected feature size; or iv. a plurality of data rates defined by the time for each of spatiotemporal scan densities SD(1,1) through SD(m,n) to become smaller than a user-selected threshold value; or v. the values determined for spatiotemporal scan densities SD(1,1) through SD(m,n) relative to a user-selected value for $D_{max}$; or vi. the rate at which each of $D_{max}(1,1)$ through $D_{max}(m,n)$ shrinks; or vii. the area under the curve of a plot of $D_{max}$ versus cycles of one of test drive frequencies $f_T1$ and $f_T2$;

viii. any combination of i, ii, iii, iv, v, vi, and vii.

Although method 600 includes a specific order of method steps, the order of the steps can differ from what is disclosed. Also, two or more steps can be performed concurrently or with partial concurrence. Such variation will depend on the software and hardware systems chosen and on designer choice, among other factors. All such variations are within the scope of the disclosure. Likewise, software implementations could be accomplished with standard programming techniques with rule-based logic and other logic to accomplish the various connection steps, calculation steps, processing steps, comparison steps, and decision steps.

Although each actuator element of a scanner is typically driven separately, there can be some feedthrough of a drive signal applied to one actuator element to another actuator element. It is an aspect of the present disclosure, however, that the effects of drive-signal feedthrough can be mitigated by operatively coupling the actuators of a scanner with a feedthrough compensation circuit.

Figure 13A:
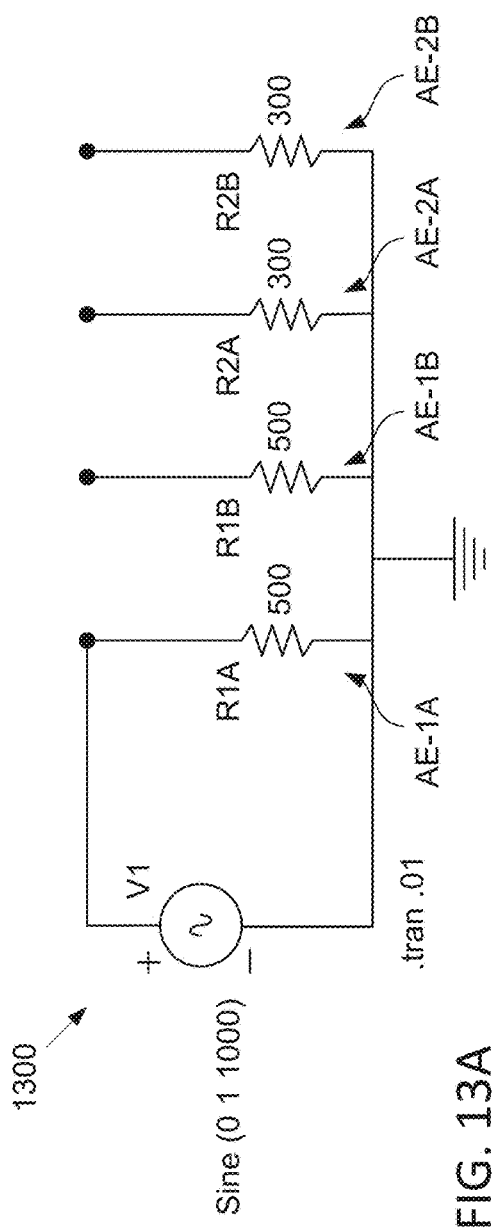
FIGS. 13A-B depict circuit models of an actuator having two actuator elements, with and without parasitic feedthrough, respectively, in accordance with the present disclosure.
Figure 13B:
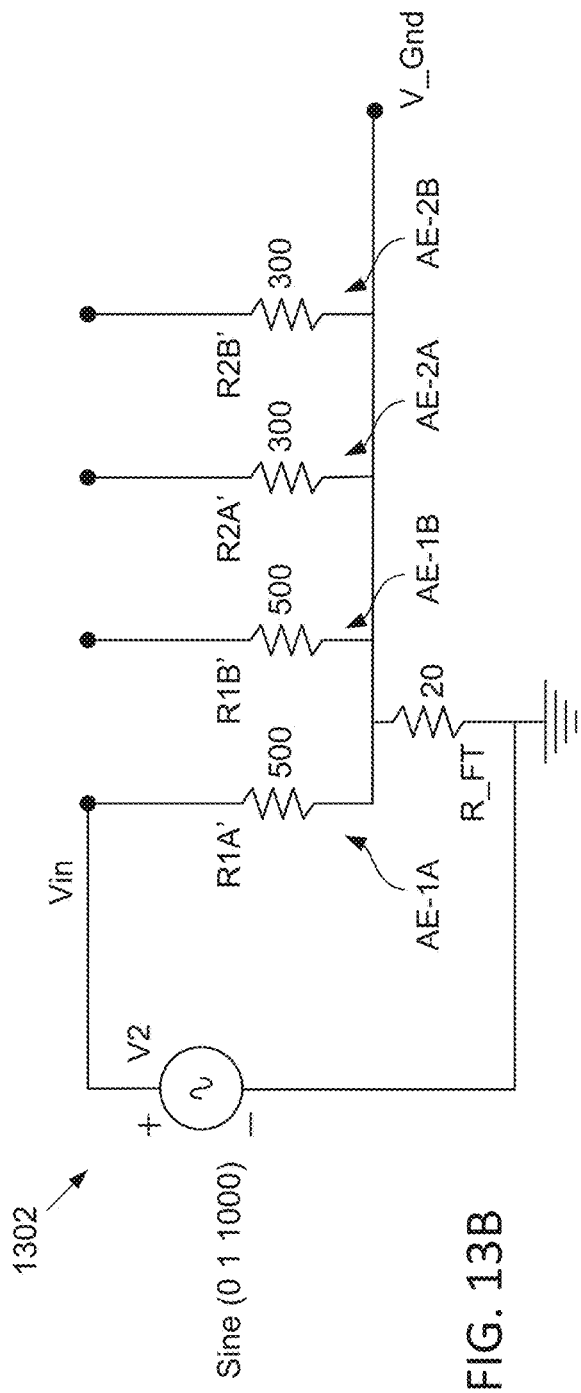

FIGS. 13A-B depict circuit models of an actuator having two actuator elements, with and without parasitic feedthrough, respectively, in accordance with the present disclosure.

In model 1300, representative values for the resistance of each actuator element is provided.

Model 1302 includes a representative feedthrough resistance of 20 Ohms, which arises from the shared routing of the actuator elements through mirror 402.

Figure 13C:
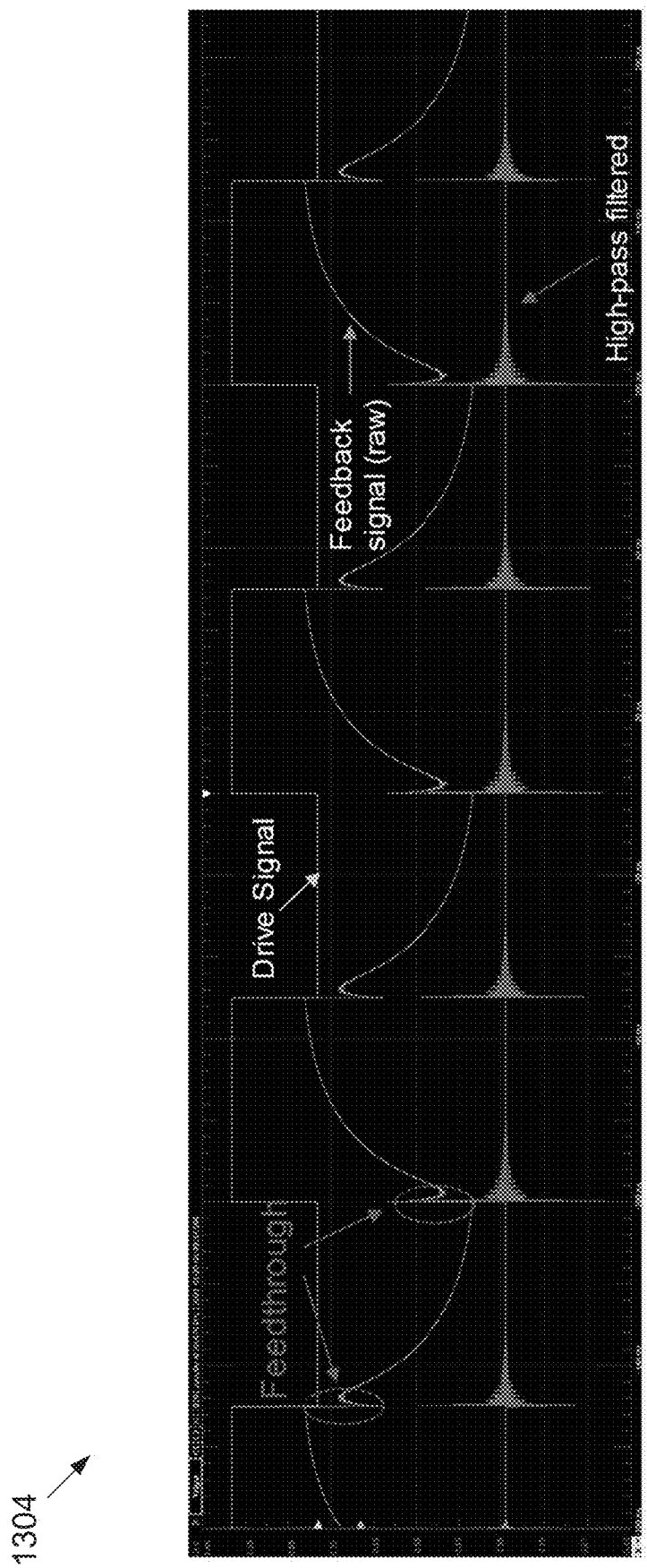
FIG. 13C depicts a plot of a representative drive signal, feedback signal, and high-pass-filtered feedback signal of a scanning mirror without feedback compensation.

FIG. 13C depicts a plot of a representative drive signal, feedback signal, and high-pass-filtered feedback signal of a scanning mirror without feedback compensation.

Figure 14:
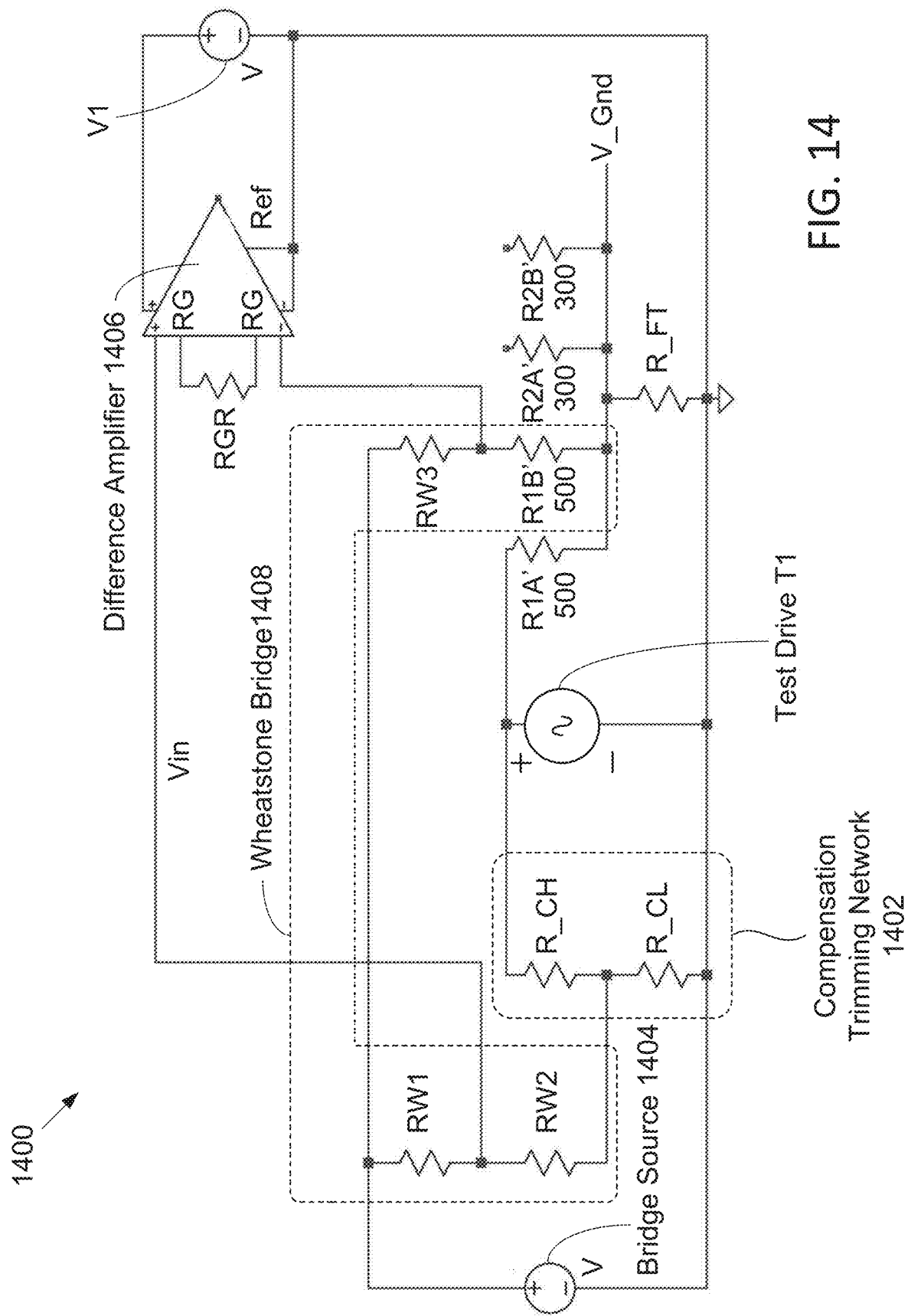
FIG. 14 depicts a diagram of an exemplary circuit network for compensating feedthrough in a scanning mirror in accordance with the present disclosure.

FIG. 14 depicts a diagram of an exemplary circuit network for compensating feedthrough in a scanning mirror in accordance with the present disclosure. Network 1400 includes compensation trimming network 1402, Wheatstone resistors RW1, RW2, and RW3, bridge source 1404, and difference amplifier 1406.

Wheatstone resistors RW1, RW2, and RW3 and the resistance R1A' (the effective resistance of actuator element AE-1A) collectively define Wheatstone bridge 1408.

In operation, a drive signal is injected into the sense branch of a Wheatstone bridge through compensation trimming network 1402, which includes R_CH and R_CL. The compensation network is preferably tuned to match the resistance of feedthrough resistor R_FT in order to mitigate feedthrough. When Test Drive T1 is applied to R1A', a bias appears at V_Gnd due to parasitic resistance R_FT. This bias produces an undesired offset at the negative input terminal of difference amplifier 1406. Compensation trimming network 1402 then applies the same bias to the branch of the Wheatstone Bridge that includes of RW1 and RW2.

Figure 15:
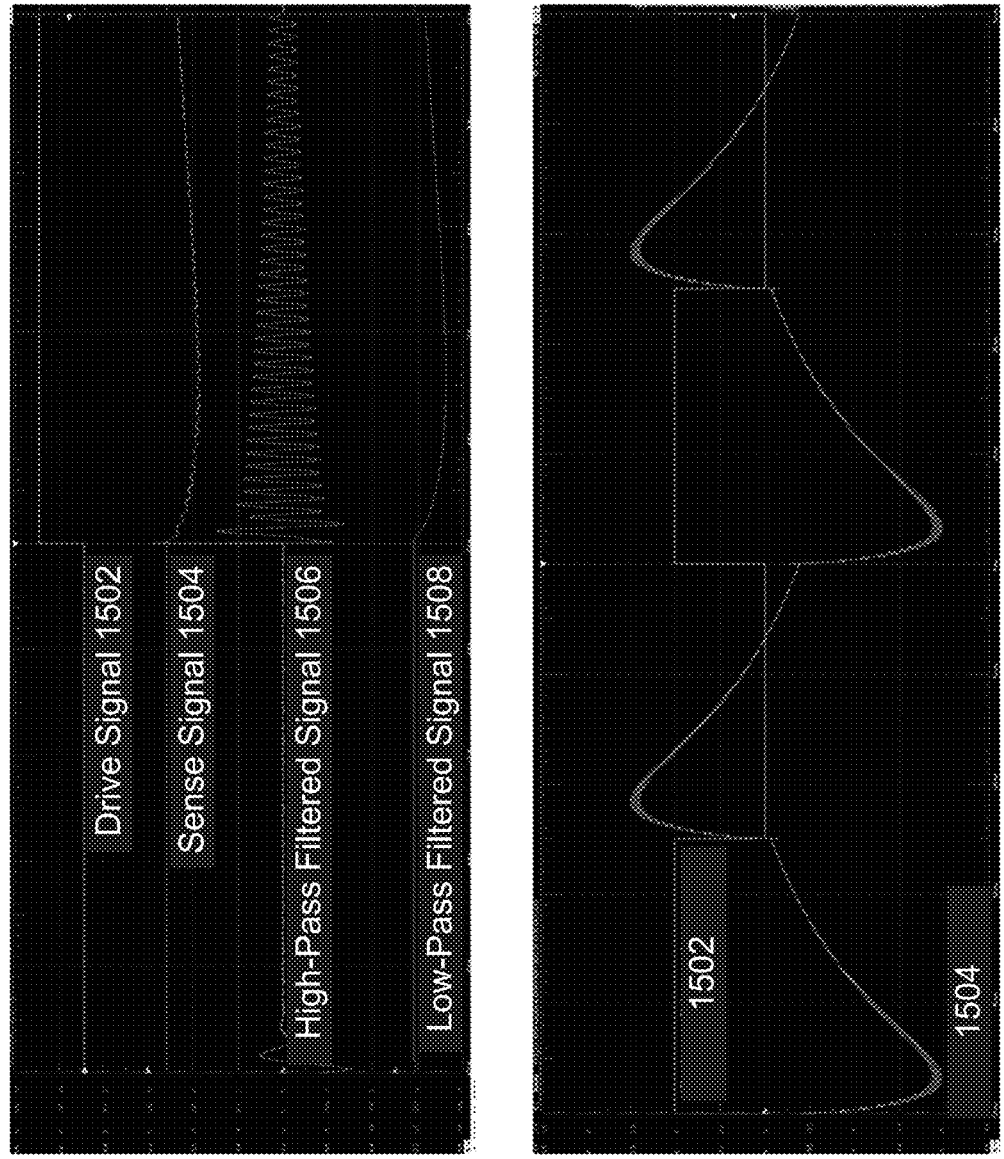
FIG. 15 depicts plots of a representative drive signal, feedback signal, and high- and low-pass-filtered feedback signals of a feedthrough-compensated scanning mirror in accordance with the present disclosure.

FIG. 15 depicts plots of a representative drive signal, feedback signal, and high- and low-pass-filtered feedback signals of a feedthrough-compensated scanning mirror in accordance with the present disclosure.

Plot 1500 shows the relationship between drive signal 1502, sense signal 1504, high-pass filtered signal 1506, and low-pass filtered signal 1508, while plot 1510 shows just the relationship between drive signal 1502 and sense signal 1504. By decomposing sense signal 1504 into its high-frequency and low-frequency components, the resonance of the actuator and the DC offset of the actuator can be visualized separately. The low-frequency component of the signal includes thermal and piezoresistive (mechanical strain) effects, while the high-frequency component includes only the piezoresistive component.

As seen from plot 1500, injection of a drive signal into the sensor branch of Wheatstone bridge 1408 effectively mitigates signal feedthrough, which enables DC measurements of actuator position to capture drift.

Figure 16:
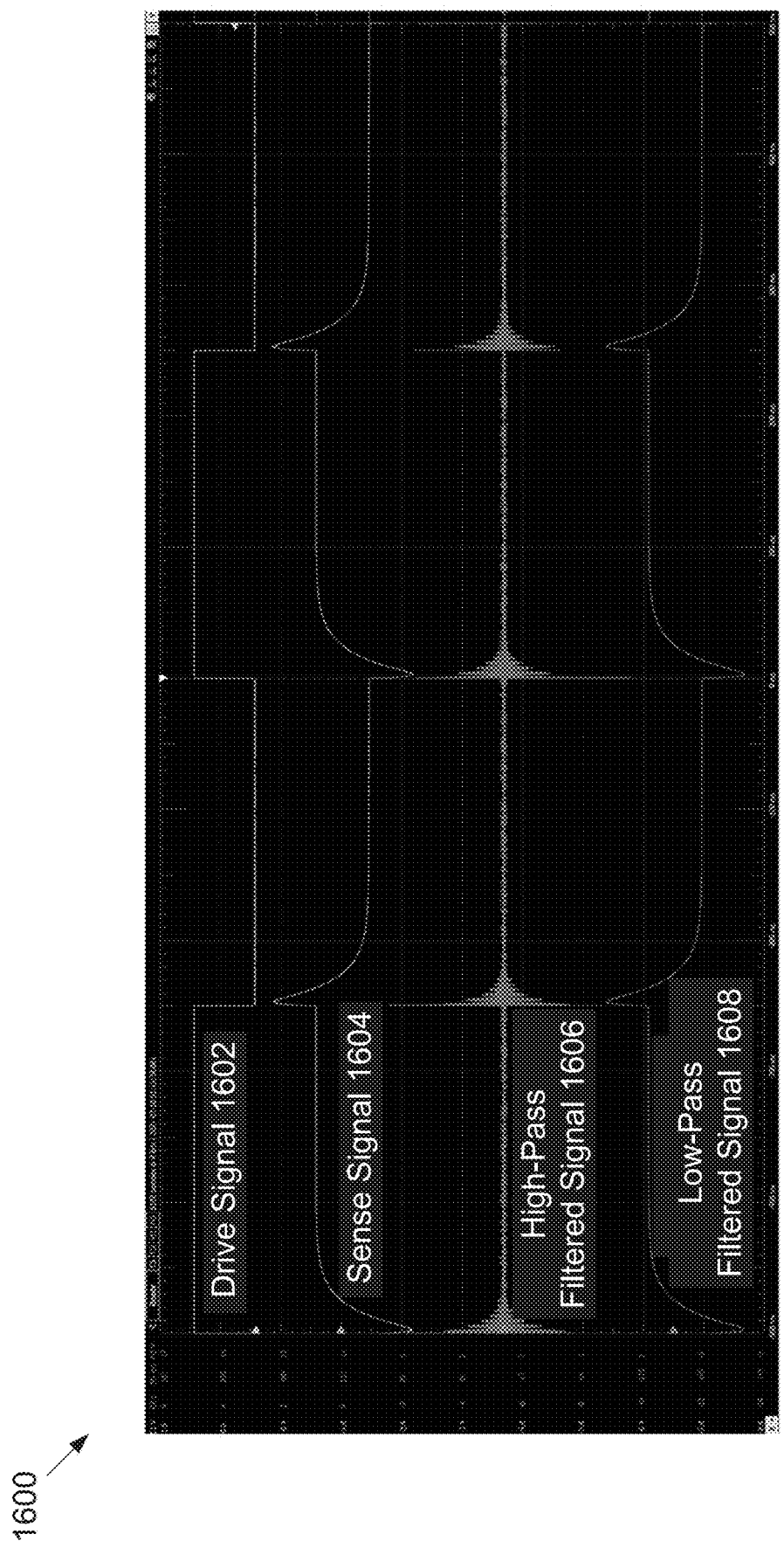
FIG. 16 depicts plots of a representative drive signal, feedback signal, and high- and low-pass-filtered feedback signal for the step response of a feedthrough-compensated actuator in accordance with the present disclosure.

FIG. 16 depicts plots of a representative drive signal, feedback signal, and high- and low-pass-filtered feedback signal for the step response of a feedthrough-compensated actuator in accordance with the present disclosure.

As seen from plot 1600, the value of the resistance of an actuator is influenced by both mechanical (piezoresistance) and thermal (TCR) effects, whereas the thermal contribution is larger and takes longer to settle.

However, a one-to-one mapping exists between the settled value of resistance and offset position of a scanning mirror in accordance with the present disclosure, as long as other disturbances (e.g. ambient temperature, external forces, etc.) are suppressed. Upon settling, the actuator temperature and strain reach steady-state values which contribute to an observed resistance change.

It should be noted that, while in resonance, the AC component of the signal is dominated by piezoresistive effects. Due to the temperature coefficient of piezoresistivity, the amplitude of the dynamic signal varies as a function of DC offset position, which can be calibrated using a ground truth measurement (e.g. imaging a projected pattern, and the like).

Figure 17:
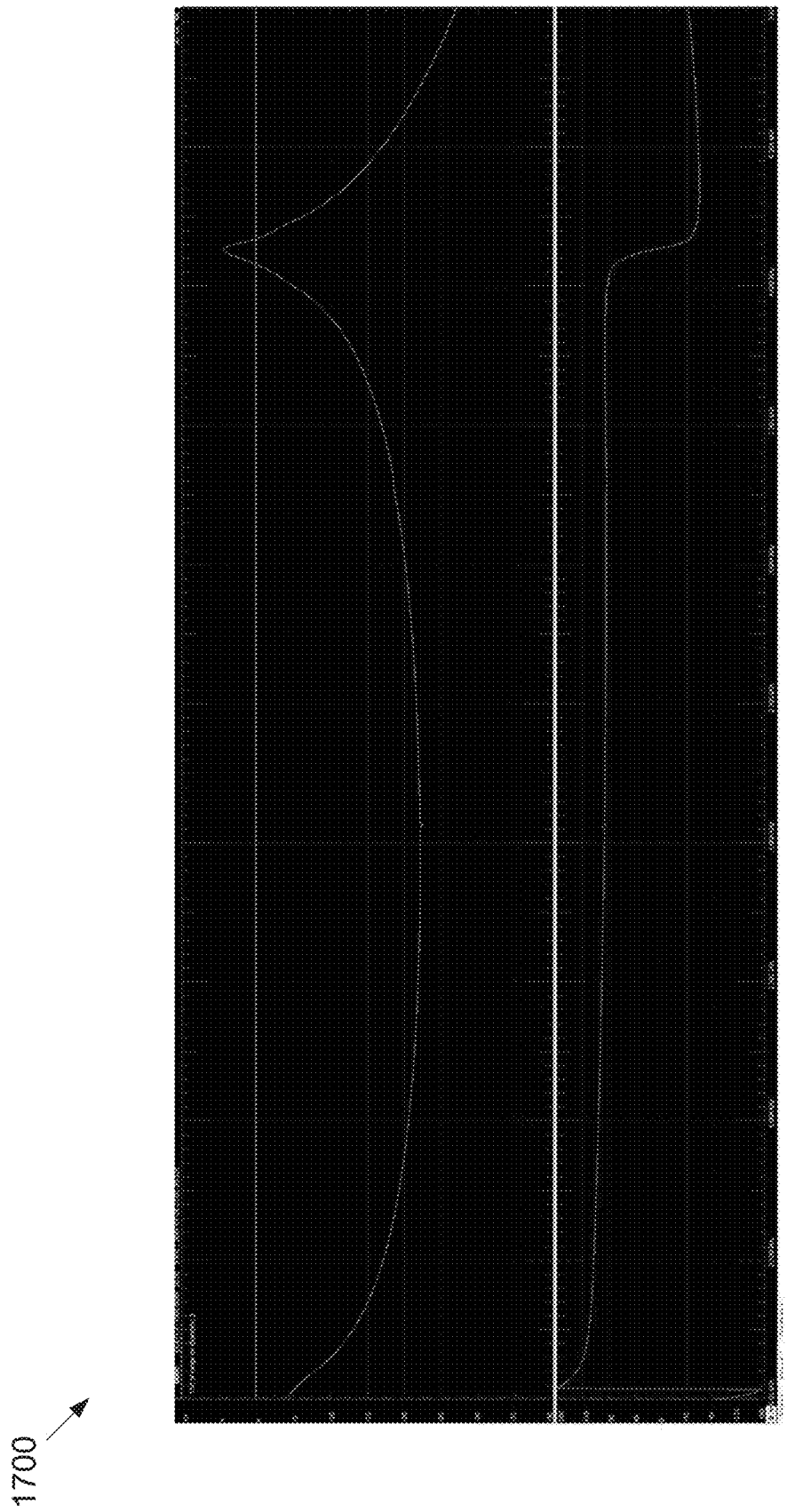
FIG. 17 depicts a plot of the frequency response of a feedback-compensated actuator in accordance with the present disclosure.

FIG. 17 depicts a plot of the frequency response of an actuator (open loop) in accordance with the present disclosure.

As seen from plot 1700, thermal, mechanical and electrical effects can be captured in the frequency response (bode) plot. It should be noted that at resonance, the phase of the resonator is near zero.

In some embodiments, an oscillator circuit is included for measuring device stability.

Figure 18:
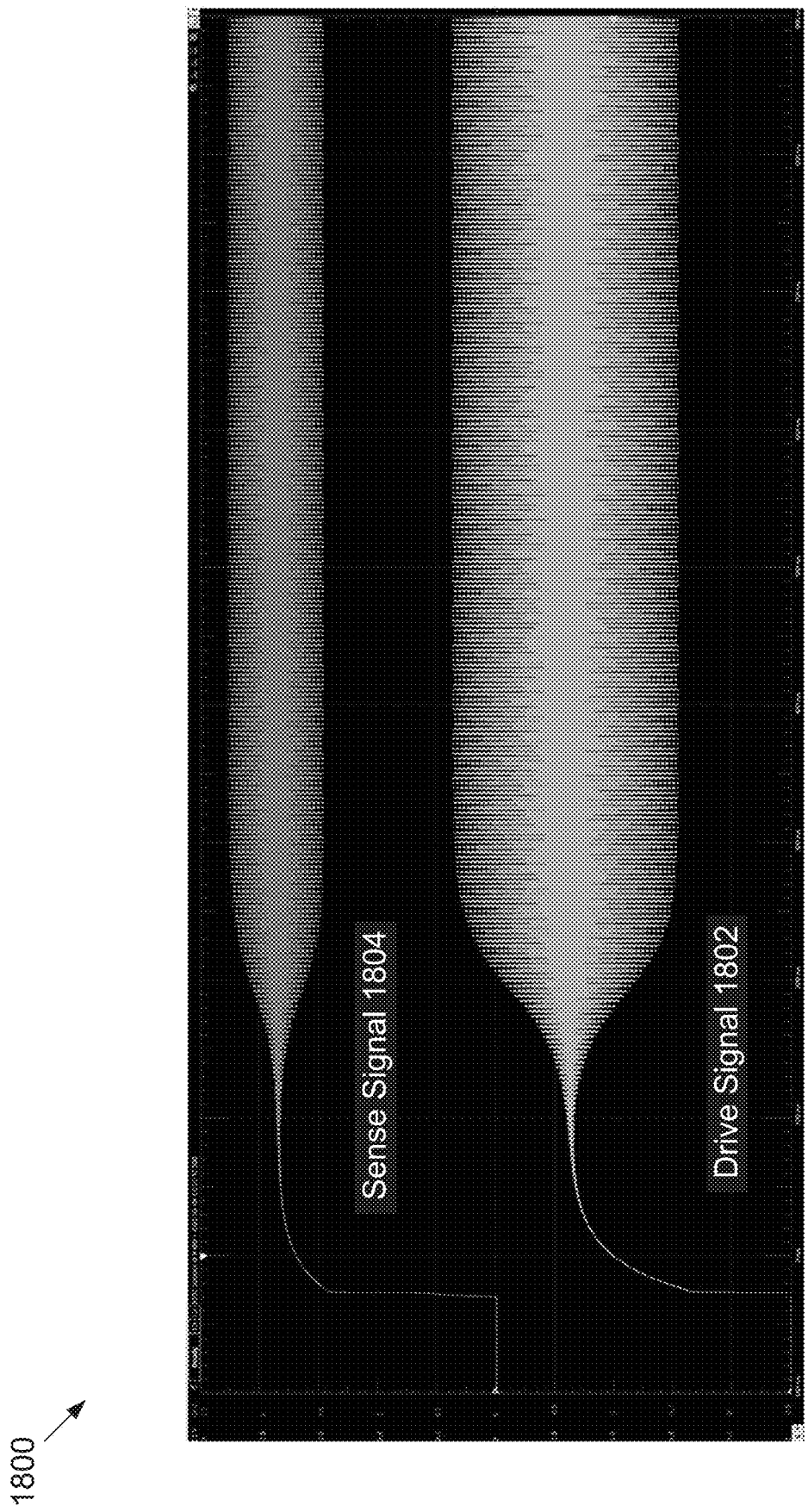
FIG. 18 depicts a plot of the frequency response of a feedback-compensated actuator in accordance with the present disclosure.

FIG. 18 depicts a plot of the frequency response of a feedback-compensated actuator in accordance with the present disclosure.

Plot 1800 shows the effect realized by placing a resonator in a feedback loop with a gain of 1 and phase shift of 360 degrees, which gives rise to an oscillation of the resonator near its natural frequency. Oscillation occurs upon power-up of the circuit. Long-term material stability of the device can be determined using commonly used methods like Allen Variance measurements. In addition, oscillator circuits can be used to precisely measure the resonant frequency of the device in order to select frequencies of operation for applications such as eye tracking, LiDAR, and the like.

It is yet another aspect of the present disclosure that mirror design choices can be made to mitigate the effects of drift, etc., on the transfer function of a scanning mirror.

For example, in some embodiments, isothermal actuation design patterns are used to improve stability of scanners to variations in room temperature. Although the total power dissipated in a pair of actuators remains constant over a range of actuation angles, a temperature distribution within an actuator exists. Hot spots in an actuator are the regions in which drift-causing effects (creep, electromigration, corrosion, etc.) occur most quickly. Design patterns that minimize the temperature gradient across an actuator produce more efficient actuation over a larger angular range, while remaining below the threshold of drift-causing effects.

Although a scanner mirror is typically isolated from package stresses by incorporating passive strain-relief flexures, as the substrate temperature fluctuates, forces can still couple to the device, giving rise to drift in both the pointing stability and resonant frequency. In some embodiments, an active flexure that responds to heat in the opposite direction of substrate expansion, is included to isolate a scanning mirror from thermally induced stresses, while also providing passive strain relief. Examples of active flexure designs suitable for use in accordance with the present disclosure include, without limitation, lateral bimorph-like structures, chevron structures, and the like. It should be noted that some such structures must be compensated for out-of-plane stresses.

In some embodiments, an active stress relief structure includes a heater element operated in a feedback loop to thermally isolate a scanning mirror from substrate temperature variations. As a result, a single flexural element can provide mechanical isolation from package stresses, thermomechanical isolation to compensate the difference in thermal expansion of the device layers as compared to the substrate, and thermal isolation from ambient/substrate temperature variations.

What is claimed is:

1. A method comprising:
providing a light scanner having a scanning element, a first actuator comprising a first portion that includes a first actuator element and a second portion that includes a second actuator element, and a second actuator comprising a third portion that includes a third actuator element and a fourth portion that includes a fourth actuator element, the first actuator being configured to rotate the scanning element about a first axis and the second actuator configured to rotate the scanning element about a second axis, wherein the first axis has a first resonant frequency and the second axis has a second resonant frequency;
applying a first test drive to the first actuator element to induce a first oscillation on the first axis;
measuring a first resistance of at least one of the second, third, and fourth portions in response to the first oscillation; and
estimating the first resonant frequency based on the first resistance.

2. The method of claim 1 further comprising providing a drive signal to the first actuator, the drive signal being based on the estimated first resonant frequency.

3. The method of claim 1 further comprising:
applying a second test drive to the third actuator element to induce a second oscillation on the second axis;
measuring a second resistance of at least one of the first, second, and fourth portions in response to the second oscillation; and
estimating the second resonant frequency based on the second resistance.

4. The method of claim 3 further comprising:
providing a light signal to the light scanner;
providing a first drive signal having a first drive frequency to the first actuator, the first drive frequency being based on the first resonant frequency; and
providing a second drive signal having a second drive frequency to the second actuator, the second drive frequency being based on the second resonant frequency;
wherein the first and second drive frequencies are selected to steer the light signal over a scan region in a precessing Lissajous pattern.

5. The method of claim 4 further comprising:
determining a spatiotemporal scan density for each of a plurality of scan patterns, wherein each scan pattern is based on the first periodic signal having a different first test frequency of a set thereof and the second periodic signal having a different second test frequency of a set thereof; and
selecting the first and second drive frequencies based on the plurality of spatiotemporal scan densities;
wherein each of the set of first test frequencies is based on the first resonant frequency and a first offset frequency; and
wherein each of the set of second test frequencies is based on the second resonant frequency and a second offset frequency.

6. The method of claim 3 wherein the second resistance is a resistance of the fourth actuator element.

7. The method of claim 3 further comprising:
enabling each of the first axis and second axis to ring down during a ring-down period;
providing an electrical signal based on a difference between the first resistance and second resistance during the ring down period;
performing a fast-Fourier transform of the electrical signal; and
estimating at least one of the first and second resonant frequencies based further on the fast-Fourier transform.

8. The method of claim 1 wherein the first resistance is a resistance of the second actuator element.

9. The method of claim 1 further comprising:
applying a first drive signal to the first axis to induce the first oscillation such that the first oscillation is at the first resonant frequency.

10. The method of claim 1 further comprising:
enabling a ring down of the first axis;
determining the number of cycles in the first resistance during ring down; and
estimating a first quality factor for the first axis based on number of cycles.

11. The method of claim 1:
wherein the light scanner is provided such that the second portion includes a first piezoresistor; and
wherein the method further comprises establishing the first resistance as a resistance of the first piezoresistor.

12. The method of claim 1 wherein the light scanner is provided such that the each of the first and second actuator elements is piezoresistive, and wherein the method further comprises:
establishing the first resistance as a resistance of the second actuator element;
enabling a ring down of the first actuator element;
determining the number of cycles in the first resistance during the ring down; and
estimating a first quality factor for the first axis based on the number of cycles.

13. The method of claim 12 further comprising mitigating feedthrough of a first drive signal applied to the first actuator element to the second actuator element.

14. The method of claim 13 wherein the first and second actuator elements are characterized by a feedthrough resistance, and wherein feedthrough of the first drive signal to the second actuator element is mitigated by operations that include:
  electrically coupling the first actuator element to a first portion of a Wheatstone bridge;
  electrically coupling the second actuator element to a second portion of the Wheatstone bridge; and
  injecting a portion of the first drive signal into the second actuator element through a compensation network having a compensation-network resistance that is substantially equal to the feedthrough resistance.

15. A method comprising:
  providing a light scanner having scanning element, a first actuator comprising a first actuator element and a second actuator element, and a second actuator comprising a third actuator element and a fourth actuator element, the first actuator being configured to rotate the scanning element about a first axis and the second actuator configured to rotate the scanning element about a second axis, wherein the first axis has a first resonant frequency and the second axis has a second resonant frequency;
  applying a first test drive to the first actuator element to induce a first oscillation on the first axis;
  establishing the first resistance as a resistance of at least one of the second actuator element, the third actuator element, and the fourth actuator element; and
  estimating the first resonant frequency based on a measurement of the first resistance during the first oscillation.

16. The method of claim 15 further comprising:
  driving the first actuator with a first drive signal that is based on the estimated first resonant frequency.

17. The method of claim 15 further comprising:
  providing a light signal to the light scanner;
  providing a first drive signal having a first drive frequency to the first actuator, the first drive frequency being based on the first resonant frequency; and
  providing a second drive signal having a second drive frequency to the second actuator, the second drive frequency being based on the second resonant frequency;
  wherein the first and second drive frequencies are selected to steer the light signal over a scan region in a precessing Lissajous pattern.

18. The method of claim 17 further comprising:
  determining a spatiotemporal scan density for each of a plurality of scan patterns, wherein each scan pattern is based on the first periodic signal having a different first test frequency of a set thereof and the second periodic signal having a different second test frequency of a set thereof; and
  selecting the first and second drive frequencies based on the plurality of spatiotemporal scan densities;
  wherein each of the set of first test frequencies is based on the first resonant frequency and a first offset frequency; and
  wherein each of the set of second test frequencies is based on the second resonant frequency and a second offset frequency.

19. The method of claim 15 further comprising estimating the second resonant frequency by operations that include:
  applying a second test drive to the third actuator element to induce a second oscillation of the second axis;
  establishing a second resistance as a resistance of at least one of the first actuator element, second actuator element, and fourth actuator element; and
  estimating the second resonant frequency based on a measurement of the second resistance during the second oscillation.

20. The method of claim 15 wherein the first resonant frequency is estimated by operations that further include:
  establishing the first resistance as a resistance of the second actuator element;
  establishing a second resistance as a resistance of the fourth actuator element;
  applying a second test drive to the third actuator element to induce a second oscillation on the second axis;
  enabling the first axis to ring down from the first oscillation during a ring-down period;
  enabling the second axis to ring down from the second oscillation during the ring-down period;
  providing an electrical signal based on a difference between the first resistance and second resistance during the ring down period; and
  estimating at least one of the first and second resonant frequencies based on a fast-Fourier transform of the electrical signal.

21. The method of claim 15 further including:
  enabling a ring down of the first axis from the first oscillation;
  determining the number of cycles in the first resistance during ring down; and
  estimating a first quality factor for the first axis based on number of cycles.

22. The method of claim 15 wherein the first resistance is established as the resistance of the second actuator element.

23. The method of claim 15 further comprising:
  applying a first drive signal to the first actuator element; and
  mitigating feedthrough of the first drive signal to the second actuator element.

24. The method of claim 23 wherein the first and second actuator elements are characterized by a feedthrough resistance, and wherein feedthrough of the first drive signal to the second actuator element is mitigated by operations that include:
  electrically coupling the first actuator element to a first portion of a Wheatstone bridge;
  electrically coupling the second actuator element to a second portion of the Wheatstone bridge; and
  injecting a portion of the first drive signal into the second actuator element through a compensation network having a compensation-network resistance that is substantially equal to the feedthrough resistance.

25. An eye tracker comprising:
  a scanner for steering a light signal in a Lissajous pattern over scan region, wherein the scanner comprises a micromechanical system (MEMS) device that is a two-axis device having a first actuator configured to rotate a scanning element about a first axis characterized by a first resonant frequency and a second actuator configured to rotate the scanning element about a second axis characterized by a second resonant frequency, and wherein the first actuator includes a first actuator element and a second actuator element, and further wherein the second actuator includes a third actuator element and a fourth actuator element; and
  a processing system configured to:
  (i) estimate the first resonant frequency based on a measurement of a first resistance of at least one of the second, third, and fourth actuator elements in response to an oscillation of the first axis induced by a first test drive applied to the first actuator element;

(ii) estimate the second resonant frequency based on a measurement of a second resistance of at least one of the first, second, and fourth actuator elements in response to an oscillation of the second axis induced by a second test drive applied to the third actuator element;

(iii) drive the first axis with a first periodic signal that is characterized by a first drive frequency;

(iv) drive the second axis with a second periodic signal that is characterized by a second drive frequency;

(v) control the first drive frequency based on the first resistance; and (vi) control the second drive frequency based on the second resistance.

26. The eye tracker of claim 25 wherein the first and second drive frequencies give rise to a precession of the Lissajous pattern.

27. The eye tracker of claim 25 further comprising a non-imaging photodetector configuration that is configured to provide at least one output signal based on a reflected signal from the scan region, wherein non-imaging photodetector configuration includes at least one non-imaging photodetector.

28. The eye tracker of claim 25 wherein the processor is further configured to:

(vii) determine a spatiotemporal scan density for each of a plurality of scan patterns, wherein each scan pattern is based on the first periodic signal having a different first test frequency of a set thereof and the second periodic signal having a different second test frequency of a set thereof;

wherein each of the set of first test frequencies is based on the first resonant frequency and a first offset frequency; and wherein each of the set of second test frequencies is based on the second resonant frequency and a second offset frequency.

29. The eye tracker of claim 28 wherein the processor is further configured to (viii) select the first and second drive frequencies based on the plurality of spatiotemporal scan densities.

30. The eye tracker of claim 25 wherein the first resistance is a resistance of the second actuator element, and wherein the second resistance is a resistance of the fourth actuator element.

31. The eye tracker of claim 25 wherein the first resistance is a resistance of at least one of the third and fourth actuator elements.

32. The eye tracker of claim 31 further comprising a compensation network configured to mitigate feedthrough of the first periodic signal from the first actuator element to the second actuator element.

* * * * *